United States Patent [19]

Kusunoki et al.

[11] Patent Number: 5,348,431

[45] Date of Patent: Sep. 20, 1994

[54] PRECISION CUTTING PROCESS MACHINE AND PRECISION CUTTING PROCESS METHOD

[75] Inventors: Haruyuki Kusunoki, Tsukuba; Kikuo Yasutome, Tsuchiura; Shigeo Yamazaki, Ushiku; Koji Furukawa, Ushiku; Takeshi Sasaki, Ushiku, all of Japan

[73] Assignee: Canon Kabushiki Kaisha, Tokyo, Japan

[21] Appl. No.: 957,821

[22] Filed: Oct. 8, 1992

[30] Foreign Application Priority Data

| Oct. 9, 1991 | [JP] | Japan | 3-261842 |
|---|---|---|---|
| Oct. 9, 1991 | [JP] | Japan | 3-261843 |
| Oct. 15, 1991 | [JP] | Japan | 3-266028 |
| Oct. 15, 1991 | [JP] | Japan | 3-266029 |
| Oct. 15, 1991 | [JP] | Japan | 3-266030 |
| Oct. 16, 1991 | [JP] | Japan | 3-267374 |
| Oct. 16, 1991 | [JP] | Japan | 3-267375 |
| Oct. 16, 1991 | [JP] | Japan | 3-267376 |
| Oct. 16, 1991 | [JP] | Japan | 3-267377 |

[51] Int. Cl.$^5$ .......................................... B23C 1/027
[52] U.S. Cl. ............................ 409/132; 83/13; 83/364; 83/368; 83/824; 83/875; 409/149
[58] Field of Search ............... 83/875, 364, 821, 824, 83/13, 614, 368, 74, 466; 384/12, 15, 107; 269/73; 409/149, 153, 162, 164, 132; 408/13

[56] References Cited

U.S. PATENT DOCUMENTS

| 3,133,571 | 5/1964 | Hensgen et al. | 83/364 |
| 3,891,015 | 6/1975 | Calcagno | 83/875 X |
| 3,994,193 | 11/1976 | Bodycomb | 83/501 |
| 4,129,291 | 12/1978 | Kato et al. | 269/73 |
| 4,200,341 | 4/1980 | Kauschke | 384/15 |
| 4,738,573 | 4/1988 | Johnson et al. | 83/875 X |
| 5,181,809 | 1/1993 | Martin | 408/13 |

FOREIGN PATENT DOCUMENTS

| 1023359 | 1/1958 | Fed. Rep. of Germany . |
| 1285275 | 12/1968 | Fed. Rep. of Germany . |
| 2255627 | 5/1974 | Fed. Rep. of Germany . |
| 2731704 | 1/1978 | Fed. Rep. of Germany . |
| 54-9075 | 1/1979 | Japan . |
| 33773 | 1/1991 | Japan . |
| 342441 | 12/1959 | Switzerland . |
| 574806 | 1/1946 | United Kingdom . |
| 1063140 | 3/1967 | United Kingdom . |
| 2112963 | 7/1983 | United Kingdom . |

OTHER PUBLICATIONS

F. G. Parsons, "Locate Machine Error to Find Lost Profit", 410 Machinery, vol. 77, pp. 52–56, New York (Oct. 1971).

Primary Examiner—Richard K. Seidel
Assistant Examiner—Kenneth E. Peterson
Attorney, Agent, or Firm—Fitzpatrick, Cella, Harper & Scinto

[57] ABSTRACT

A precision cutting process machine aligns a workpiece to be subjected to a precision cutting process by a continuously rotating cutting tool relative to the cutting tool, and cuts the work into a predetermined pattern so as to form fine grooves at a predetermined pitch by a continuous cutting processes. The machine includes a main body base portion and an up-and-down moving table driven in the up-and-down direction with respect to the main body base portion. The cutting tool, which is arranged on the up-and-down moving table, sets a plane formed upon rotation of the cutting tool on a plane along the back-and-forth direction of the main body base portion and is continuously rotated; back-and-forth moving table is driven in the back-and-forth direction with respect to the main body base portion, a right-and-left moving table is fixed on the back-and-forth moving table and driven in the right-and-left direction with respect to main body base portion, a holding device is arranged on the right-and-left moving table for detachably holding the work, and a measurement device is arranged on the up-and-down moving table for measuring dimensions of the workpiece in the up-and-down and right-and-left directions. In order to perform the cutting process of the workpiece held by the holding device, the moving amount in the up-and-down direction of the cutting tool, which is arranged on the up-and-down table and continuously rotated, is measured by the measurement device while the moving amount, in the right-and-left direction, of the workpiece held by the holding device on the right-and-left moving table is measured by the measurement device.

25 Claims, 29 Drawing Sheets

PRECISION CUTTING PROCESS MACHINE AND PRECISION CUTTING PROCESS METHOD

BACKGROUND OF THE INVENTION

In order to cut fine grooves with high precision, the position of a workpiece to be cut relative to a cutting tool rotated at high speed is aligned with high precision, and then a cutting process is performed.

FIELD OF THE INVENTION

The present invention relates to a precision cutting process machine for precisely aligning a work (a workpiece) relative to a cutting tool rotated at high speed, and cutting the work, and a precision cutting process method and, more particularly, to a technique suitable for successively cutting fine grooves at a predetermined pitch with high precision.

DESCRIPTION OF THE RELATED ART

A conventional cutting process will be described below with reference to the drawings. As shown in the front view of a cutting state in FIG. 28A, a cutting tool 124 is attached to a rotating shaft 122 by, e.g., a screw, and the rotating shaft 122 is rotated at high speed in a direction of an arrow J in FIG. 28A. A groove is cut while a work 128 fixed on a moving stage or table 126 is moved in a direction of an arrow H in FIG. 28A.

Thereafter, as shown in the side view of FIG. 28B, the moving table 126 is moved by a predetermined pitch P in a direction of an arrow I perpendicular to the direction of the arrow H, and then, the cutting process of the next groove is performed. Then, this cutting process is sequentially repeated to obtain the work 128 as the finished product, as shown in FIG. 29.

However, according to the conventional method described above, in order to assure the process precision of the work 128, the work must be detached from the cutting process machine after a cutting process using a single cutting tool so as to measure the dimensions of the cut portions. In this case, when the cut amount is insufficient, the cutting amount must be re-set, and cutting processes must be performed again. Such operations must be repeated. When grooves having different patterns must be cut at a plurality of positions on a single work, the cutting tool 124 is exchanged. In this case, it is difficult to obtain high mounting precision by a conventional cutting tool clamping method (e.g., by fastening a cutting tool using a screw). For this reason, every time the cutting tool is exchanged, the depth of cut and the cutting position must be measured before the cutting processes, resulting in cumbersome operations.

As described above, according to the conventional cutting process method, when a work is subjected to cutting processes, the work must be detached and attached upon measurement of the cut state or every time the cutting tool is exchanged, thus requiring a very long period of time.

Furthermore, repetitive detachment/attachment of a work leads to a decrease in cutting process precision since it is difficult to assure the high mounting precision of the work.

In addition, it is required to lessen cumbersome operations for detaching a work from the cutting process machine after every cutting process, measuring the dimensions of the cut portions, re-setting a cutting amount, and then performing cutting processes again.

In a conventional arrangement of a translation mechanism for an up-and-down moving table, a ball screw nut, threadably engaged with a ball screw shaft member directly coupled to the output shaft of a driving motor, for converting rotation into a linear motion is arranged to the up-and-down moving table through a fixing means (coupling) so as not to transmit whirling vibration of the ball nut screw and the like to the up-and-down moving table side. As a countermeasure against overrunning of the up-and-down moving table, a stop means (stopper) directly contacting the moving end of the up-and-down moving table is provided to the base side, thereby preventing overrunning of the up-and-down moving table.

However, according to the above-mentioned arrangement of the up-and-down moving table, when the up-and-down moving table overruns, and is stopped upon direct collision between the moving end of the up-and-down moving table and the stop means (stopper), a considerable external force acts on the fixing means (coupling), and the fixing means may be damaged by the buckling load.

According to the above-mentioned conventional method, in order to assure the process precision of the work 128, the work must be detached from the cutting process machine after a single cutting tool cutting process so as to measure the dimensions of cut portions. In this case, when the cut amount is insufficient, the cutting amount must be re-set, and cutting processes must be performed again.

In the cutting processes, since cutting powder or mist of cutting oil is always generated, bellows as a shielding means are provided to the moving table 126 so as to be able to extend/retract in the moving direction, thereby preventing foreign matters from entering a driving system inside the moving table.

However, since the cutting powder or the mist of cutting oil is scattered in every direction, the conventional bellows cannot sufficiently prevent entrance of foreign matters, and especially, high precision cannot be maintained for a long period of time.

It is proposed to lessen cumbersome conventional operations for detaching a work from the cutting process machine after every cutting process, measuring the dimensions of the cut portions, re-setting a cutting amount, and then performing cutting processes again. For this purpose, the cutting process machine comprises a precision aligning means for precisely aligning the cutting tool relative to a work, and an arrangement for performing full-automatic continuous cutting processes upon being connected with, e.g., a computer, can be realized.

However, when the arrangement for precisely aligning the cutting tool relative to the work is employed, and the full-automatic continuous cutting processes are performed, if a work is overloaded due to a programming error or an operation error, the precision alignment may suffer from an error, or high precision cannot be maintained due to the damage of a supporting portion. For this reason, a work must be prevented from being overloaded.

However, according to the conventional method, in order to assure prescribed process precision of the work 128, the work must be detached from the cutting process machine after a single cutting tool cutting process to measure the dimensions of cut portions. In this case, when the cut amount is insufficient, the cutting amount is re-set, and cutting processes are performed again. Such operations must be repeated. When grooves having different patterns must be cut at a plurality of positions on a single work, the cutting tool 124 is exchanged. In this case, it is difficult to obtain high mounting precision by a conventional cutting tool clamping method (e.g., by fastening a cutting tool using a screw). For this reason, every time the cutting tool is exchanged, the depth of cut and the cutting position must be measured before cutting processes, resulting in cumbersome operations.

The position, with respect to a bearing portion, of a work holding member integrated with an attaching portion for receiving a work is regulated to exchangeably statically support a work, thereby assuring prescribed precision.

However, when a work is exchangeably supported using static pressure type fluid bearings, foreign matters such as dust enter the static support portion, and required precision cannot be supported. In particular, entrance of cutting powder generated in the cutting process of the work must be prevented.

It is proposed to lessen cumbersome conventional operations for detaching a work from the cutting process machine after every cutting process, measuring the dimensions of the cut portions, re-setting a cutting amount, and then performing cutting processes again. For this purpose, the cutting process machine comprises a precision aligning means for precisely aligning the cutting tool relative to a work, and continuous cutting processes can be performed.

However, when the arrangement for precisely aligning the cutting tool relative to the work is employed, and the cutting tool is continuously used, thermal expansion/contraction of the cutting tool due to a temperature rise noticeably occurs in a rotational support shaft for rotationally supporting the cutting tool. As a result, the precision alignment may suffer from an error.

According to the conventional method, a work must be detached from the cutting process machine to measure the dimensions of cut portions. When the cut amount is insufficient, the cutting amount must be re-set, and the cutting processes must be performed again, resulting in a cumbersome operation. Thus, it may be proposed to perform the cutting processes while a work is fixed in position, and to measure the dimensions of cut portions by a measurement means arranged near the cutting tool.

However, when the measurement means is arranged near the cutting tool, since it is influenced by the vibration of the cutting tool, precise measurement in units of microns may be disturbed.

According to the above-mentioned conventional method, in order to assure prescribed process precision of the work 128, the work must be detached from the cutting process machine after a single cutting tool cutting process to measure the dimensions of cut portions. In this case, when the cut amount is insufficient, the cutting amount is re-set, and cutting processes are performed again. Such operations must be repeated. When grooves having different patterns must be cut at a plurality of positions on a single work, the cutting tool 124 is exchanged. In this case, it is difficult to obtain high mounting precision by a conventional cutting tool clamping method (e.g., by fastening a cutting tool using a screw). For this reason, every time the cutting tool is exchanged, the depth of cut and the cutting position must be measured before cutting processes, resulting in cumbersome operations.

As described above, according to the conventional cutting process method, when a work is subjected to cutting processes, the work must be detached and attached upon measurement of the cut state or every time the cutting tool is exchanged, thus requiring a very long period of time.

Furthermore, repetitive detachment/attachment of a work leads to a decrease in cutting process precision since it is difficult to assure prescribed mounting precision of the work.

SUMMARY OF THE INVENTION

Therefore, the present invention has been made in consideration of the conventional problems, and it is an object of the first invention to provide a precision cutting process machine, which can continuously perform cutting processes of a work with high precision when the work is precisely aligned relative to a cutting tool rotated at high speed, and cutting processes are performed.

It is another object of the first invention to provide a cutting process machine, which can omit a cumbersome operation for detaching a work from the machine after every cutting process when at least one cutting process (for at least one position) of the work is performed.

It is still another object of the first invention to prevent a fixing means (coupling) from being damaged by a buckling load upon reception of an excessive external force when an up-and-down moving table overruns and is forcibly stopped.

It is still another object of the first invention to provide a right-left moving table structure, which can sufficiently prevent entrance of foreign matters and can especially maintain high precision for a long period of time.

It is still another object of the present invention to prevent a work support member from being overloaded and precision alignment from suffering from an error by preventing a work or a work support from being overloaded due to a programming error or an operation error, and to maintain a support state of the work by preventing the work from being overloaded when an arrangement for precisely aligning a cutting tool relative to a work is employed, and full-automatic continuous cutting processes are executed.

It is still another object of the first invention to assure prescribed precision by preventing entrance of foreign matters in a static support portion when the position, with respect to a bearing portion, of a work holding member integrated with an attaching portion for receiving a work is regulated to be supported by static pressure type fluid bearings.

It is still another object of the first invention to prevent precision alignment from suffering from an error by preventing thermal expansion/contraction of a cutting tool due to a temperature rise when an arrangement for precisely aligning a cutting tool relative to a work is employed, and the cutting tool is continuously used.

It is still another object of the first invention to provide a precision cutting process machine which allows a precise measurement in units of microns without being influenced by a vibration of a cutting tool even when a measurement means is arranged near the cutting tool.

It is an object of the second invention to provide a precision cutting process method, which can perform continuous cutting processes of a work with high precision when a work is precisely relatively aligned before the cutting processes.

In order to achieve the above objects, according to the present invention, there is provided a precision cutting process machine for aligning a work to be subjected to a cutting process by a continuously rotating cutting tool relative to the cutting tool, and cutting the work in a predetermined pattern, comprising a main body base portion of the precision cutting process machine, an up-and-down moving table driven in an up-and-down direction with respect to the main body base portion, the cutting tool which is arranged on the up-and-down moving table, sets a plane formed upon rotation of the cutting tool on a plane along a back-and-forth direction of the main body base portion, and is continuously rotated, a back-and-forth moving table driven in the back-and-forth direction with respect to the main body base portion, a right-and-left moving table fixed on the back-and-forth moving table, and driven in a right-and-left direction with respect to main body base portion, holding means, arranged on the right-and-left moving table, for detachably holding the work, and measurement means, arranged on the up-and-down moving table, for measuring dimensions of the work in the up-and-down and right-and-left directions. In order to perform the cutting process of the work held by the holding means, the moving amount, in the up-and-down direction, of the cutting tool, which is arranged on the up-and-down table and continuously rotated, is measured by the measurement means, while the moving amount, in the right-and-left direction, of the work held by the holding means on the right-and-left moving table is measured by the measurement means. The work and the cutting tool are relatively aligned, and the work is cut into a predetermined pattern by the movement of the back-and-forth moving table in the back-and-forth direction, and rotation of the cutting tool.

Preferably, the holding means comprises a holder portion for holding and fixing the work, and a holder bearing portion allowing the holder portion to be able to be inserted/removed, and fixed on the right-and-left moving table. The holder bearing portion is arranged in a direction along the plane formed upon rotation of the cutting tool, and the holder portion is supported by static pressure type fluid bearing with respect to the holder bearing portion so as to be able to be inserted/removed, thus allowing a continuous cutting process of the work with high precision.

Preferably, by using a static pressure type fluid bearing the cutting tool is statically supported so as to be able to be inserted/removed with respect to the up-and-down moving table, thus allowing a continuous cutting process of the work with high precision.

Preferably, the up-and-down moving table comprises guide means for converting a pivoting force of an output shaft of driving means provided to the main body base portion into a reciprocal linear motion, and moving a moving member in a direction parallel to the up-and-down direction of the main body base portion, fixing means for interposing the conversion means for conversion with respect to the moving member, elastic portions allowing the fixing means to be two-dimensionally movable on a plane perpendicular to a moving direction of the moving member, and arranged to be shifted from each other in the moving direction, and a regulating portion for regulating the movement of the moving member by bringing a stop member fixed to the output shaft in direct contact with the conversion means. When the up-and-down moving table overruns and is stopped, the fixing means (coupling) can be prevented from being damaged by a buckling load upon reception of an excessive external force.

Preferably, the output shaft comprises a ball screw shaft body, and the conversion means comprises a ball screw nut, so that rotation-linear motion conversion can be efficiently performed.

Preferably, the guide means is arranged in the up-and-down direction with respect to the main body base portion to guide the moving member in the up-and-down direction, and balancing means balanced with a weight of the moving member is arranged. Thus, a load upon conversion of a pivoting force of the output shaft into a reciprocal linear motion is reduced, and when the up-and-down moving table overruns and is stopped, the fixing means (coupling) can be prevented from being damaged by a buckling load upon reception of an excessive external force.

Preferably, shielding means extendable in a driving direction of the right-and-left moving table are arranged at opposing end portions of the right-and-left moving table, and a lower edge portion of the shielding means is dipped in a liquid groove chamber arranged on the back-and-forth moving table, thereby preventing entrance of a foreign matter between the back-and-forth moving table and the right-and-left moving table.

Preferably, the machine further comprises cutting state monitoring means for monitoring a cutting process state of the work statically supported with respect to the main body base portion, and a contact state between the holder portion and the holder bearing portion is electrically detected by electrode portions connected to the holder portion and the holder bearing portion, thereby detecting generation of an overload acting on the work or the holder portion.

Preferably, the holder bearing portion comprises a pneumatic bearing body formed of a conductive porous member, and also serves as the electrode portion.

Preferably, an attaching portion is integrally provided to the holder portion for holding and fixing the work, the holder portion is statically supported by performing position regulation with respect to the holder bearing portion, and the attaching portion, the holder portion, and the bearing portion are enclosed by an air-tight enclosure, the outer air being supplied into the air-tight enclosure to hold an internal pressure of the air-tight enclosure to be higher than an external pressure, thereby preventing entrance of a foreign matter.

Preferably, the holder portion is detachably provided to the holder bearing portion in a work process direction, and the air-tight enclosure is removably arranged, thus facilitating an exchange operation of the holding means of the work.

Preferably, a supply pipe for supplying the outer air is different from a pipe used for the static fluid support, and exhausted air used for the static fluid support is utilized for supplying the outer air, thereby omitting the need for exclusive outer air supply means.

Preferably, leakage control of the supplied outer air is made to satisfy $Pa > Pb > Pc$, where $Pa$ is the outer air supply pressure into the air-tight enclosure, $Pb$ is the internal pressure in the air-tight enclosure, and $Pc$ is the external atmospheric pressure. Thus, entrance of foreign matter can be prevented.

Preferably, the cutting tool is arranged integrally with a rotary spindle, and the rotary spindle is statically supported in radial and thrust directions to be able to be inserted/removed, and cooling means for preventing the rotary spindle axially supported on the up-and-down moving table from thermally expanding/contracting in the thrust direction is arranged at a predetermined position of the axial support. Thus, any temperature rise is suppressed by the cooling means, and when the cutting tool is continuously or intermittently used, the cutting tool can be prevented from thermally expanding/contracting due to a temperature rise.

Preferably, the rotary spindle is statically supported in the radial and thrust directions to be able to be inserted/removed, and the cooling means is arranged to supply air to the static support portion. Thus, when the cutting tool is continuously or intermittently used, the cutting tool can be prevented from thermally expanding/contracting due to a temperature rise.

Preferably, the rotary spindle is directly engaged with an engaging portion formed on an end portion of an output shaft of an oil-cooling type driving motor incorporated in the up-and-down moving table so as to transmit a rotational force. Thus, the cutting tool can be directly coupled to the driving motor, and when the cutting tool is continuously or intermittently used, the cutting tool can be prevented from thermally expanding/contracting due to a temperature rise.

Preferably, the rotary spindle and the cutting tool are formed of a predetermined metallic material having a small thermal expansion coefficient. Thus, when the cutting tool is continuously or intermittently used, the cutting tool can be prevented from thermally expanding/contracting due to a temperature rise.

Preferably, the support portion of the rotary spindle is subjected to a hard surface treatment, thus preventing damage upon insertion/removal. In addition, when the cutting tool is continuously or intermittently used, the cutting tool can be prevented from thermally expanding/contracting due to a temperature rise.

Preferably, a driving motor is fixed to the up-and-down moving table, and the measurement means is fixed to the up-and-down moving table through an attaching member different from a fixing member for the driving motor so as to precisely align the work in the up-and-down and right-and-left directions relative to the cutting tool rotated by the driving motor and to perform the cutting process. Thus, the measurement means can be prevented from being influenced by the vibration of the cutting tool connected to the driving motor. Preferably, the driving motor has cooling means connected to an air supply portion, so that a temperature rise of the driving motor does not influence the fixing means, and an influence on the attaching member and the measurement means is minimized.

Preferably, the measurement means comprises a first microscope for measurement in the up-and-down direction and a second microscope for measurement in the right-and-left direction, and the attaching member is divided for the first and second microscopes, so that the two microscopes are independently detachable.

Preferably, the cutting tool is formed as a forming tool, and is rotated at high speed to perform the cutting process, thereby obtaining fine grooves, and a finished work is used as a metal mold member for resin injection molding of an ink jet nozzle for performing recording by ejecting an ink.

Preferably, there is provided a precision cutting process method for a precision cutting process machine for aligning a work to be subjected to a cutting process by a continuously rotating cutting tool relative to the cutting tool, and cutting the work in a predetermined pattern. The machine comprises a main body base portion of the precision cutting process machine and, an up-and-down moving table driven in an up-and-down direction with respect to the main body base portion. The cutting tool, which is arranged on the up-and-down moving table, sets a plane formed upon rotation of the cutting tool on a plane along a back-and-forth direction of the main body base portion and is continuously rotated, and a back-and-forth moving table is driven in the back-and-forth direction with respect to the main body base portion. A right-and-left moving table is fixed on the back-and-forth moving table and driven in a right-and-left direction with respect to main body base portion, holding means is arranged on the right-and-left moving table for detachably holding the work, measurement means is arranged on the up-and-down moving table for measuring dimensions of the work in the up-and-down and right-and-left directions, and control means is connected to the measurement means and the up-and-down, right-and-left, and back-and-forth moving tables. The method comprises the first step of inputting in advance a desired pattern after a cutting process of the work to the control means, the second step of performing the measurement of the dimensions after a trial cutting process of a portion of the work within a cutting range is performed by the cutting tool, and inputting a measurement result to the control means, the third step of calculating a correction value from data input in the second and first steps, the fourth step of driving the right-and-left moving table and the up-and-down moving table so as to perform the precision alignment on the basis of the correction value, and the fifth step of performing the cutting process of the work to have the desired pattern. The precision cutting process of the work is performed by driving the moving tables, and the like.

Preferably, the holding means comprises a holder bearing portion statically supported on the right-and-left moving table, and a holder portion statically supported by the holder bearing portion, and held to be able to be inserted/removed in the back-and-forth direction. The method further comprises the preparation step of fixing the work to the holder portion, and then setting the holding state, and the post step of removing the holder portion from the holder bearing portion. The precision cutting process is performed without influencing the precision cutting process precision of the work, and a mounting operation of the work is facilitated.

Preferably, the work is formed to have a planar shape, an upper edge portion of the work is held along a driving direction of the right-and-left moving table, an end portion of the upper edge portion of the work is cut in the trial cutting process as the portion within the cutting range, and thereafter, the fifth step is repetitively executed while performing a driving operation by a predetermined pitch in the right-and-left direction, thereby executing the precision cutting processes.

Preferably, the cutting tool is formed as a forming tool, and is rotated at high speed to perform the cutting process, thereby obtaining fine grooves, and a finished work is used as a metal mold member for resin injection molding of ink jet nozzle for performing recording by ejecting an ink.

In order to achieve the above-mentioned objects, various other modifications may be made within the scope of the claims.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An arrangement for successively cutting fine grooves in a work, or workpiece, according to an embodiment of the present invention will be described in detail hereinafter with reference to the accompanying drawings.

In this embodiment, a plurality of fine grooves are cut in a work at a predetermined pitch of 10 to 100 $\mu$m so as to form a metal mold member for resin-molding an ink-jet nozzle portion.

Overall Arrangement

Figure 1:
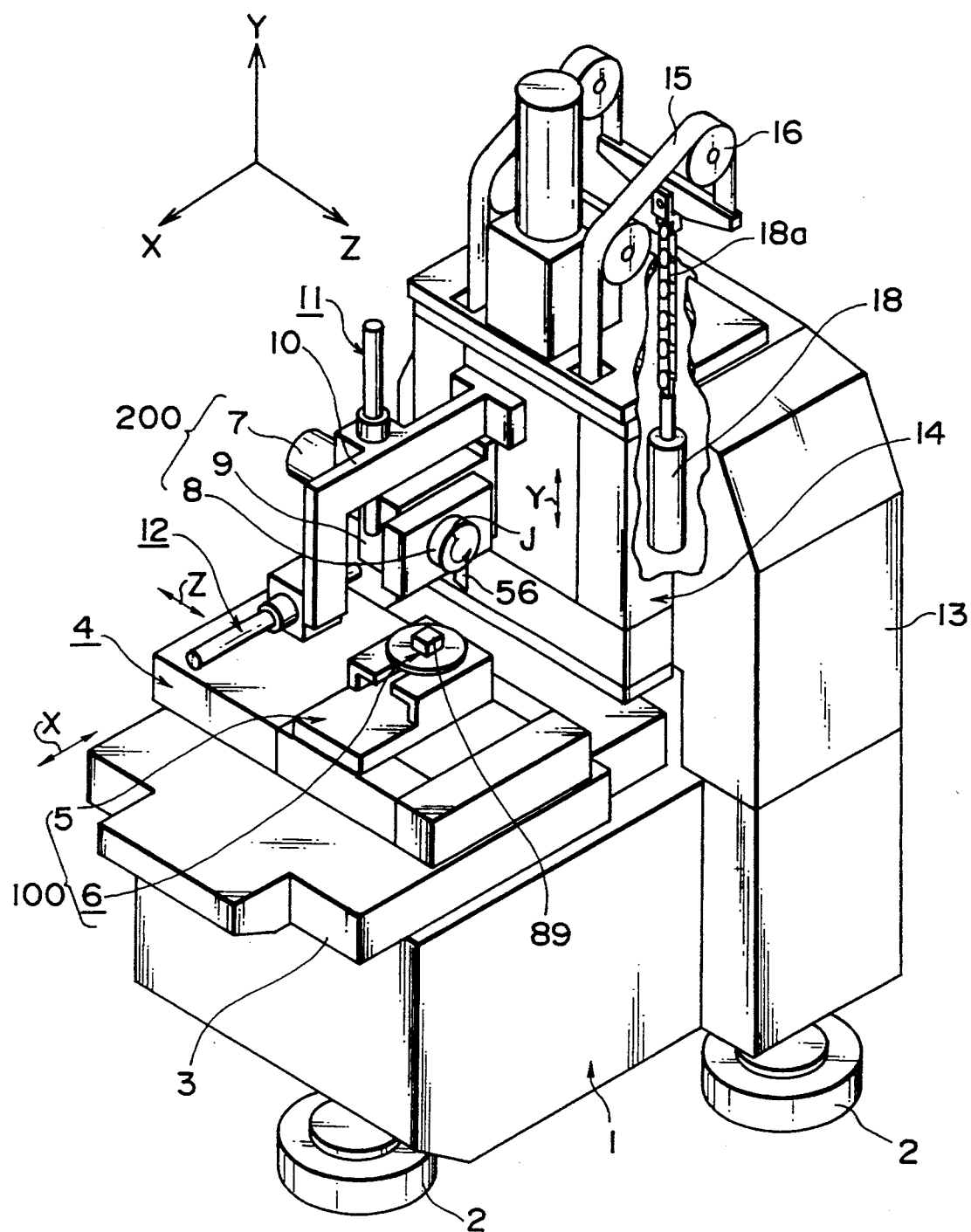
FIG. 1 is a perspective view showing the outer appearance according to an embodiment of the present invention.

FIG. 1 is a partially cutaway perspective view showing the outer appearance of an apparatus of this embodiment. The arrangement will be briefly described below with reference to FIG. 1. Three or more air cushions 2 are arranged on the bottom portion of a base 1 serving as a mounting base of constituting members (to be described later) so as to absorb external vibrations, i.e., to prevent vibrations which adversely influence a cutting process from being transmitted to the base 1. An X feed table 3 guided by an oil static pressure is arranged immediately above the base 1 so as to be driven in a direction of an arrow X in FIG. 1. A Z cutting table 4 is arranged on the X feed table 3 so as to be driven in a direction of an arrow Z perpendicular to the driving direction of the X feed table 3. A work holding portion 100 constituted by a bearing portion 5 and a holder 6 for holding a work is fixed on the cutting table 4. The work holding portion 100 is moved in a plane defined by the X-Z directions by the X feed table 3 and the Z cutting table 4, so that a work can be precision-driven to a position relative to a rotating cutting tool (to be described later).

A Y up-and-down table 14 is arranged in the vertical direction of the base 1. The Y up-and-down table 14 is supported by an oil static pressure guide which is driven in a direction perpendicular to the above-mentioned X feed table 3 and the Z cutting table 4. A spindle unit 200 is fixed to the Y up-and-down table 14 through a bracket 9. As shown in FIG. 1, the spindle unit 200 is constituted by a spindle body 7 and a cutting tool holder 8. The spindle unit 200 rotates a cutting tool 56 attached to the cutting tool holder 8 at high speed in a direction of an arrow J in FIG. 1, and is precision-driven in a direction of an arrow Y as the vertical direction of the base 1 by a hydraulic cylinder 18 through steel belts 15 and pulleys 16 while maintaining a balanced state.

Another bracket 10 is fixed to the Y up-and-down table 14 in addition to the bracket 9. A vertical microscope 11 for observing a cutting process state of a work from the vertical direction, and a horizontal microscope 12 for observing the cutting process state of the work from the horizontal direction along the above-mentioned X-Z plane are fixed to the bracket 10.

With the above-mentioned arrangement, cutting processes of a work are executed, and at the same time, the dimensions of the work are measured.

Arrangement of Y Up-and-down Table 14

Figure 2:
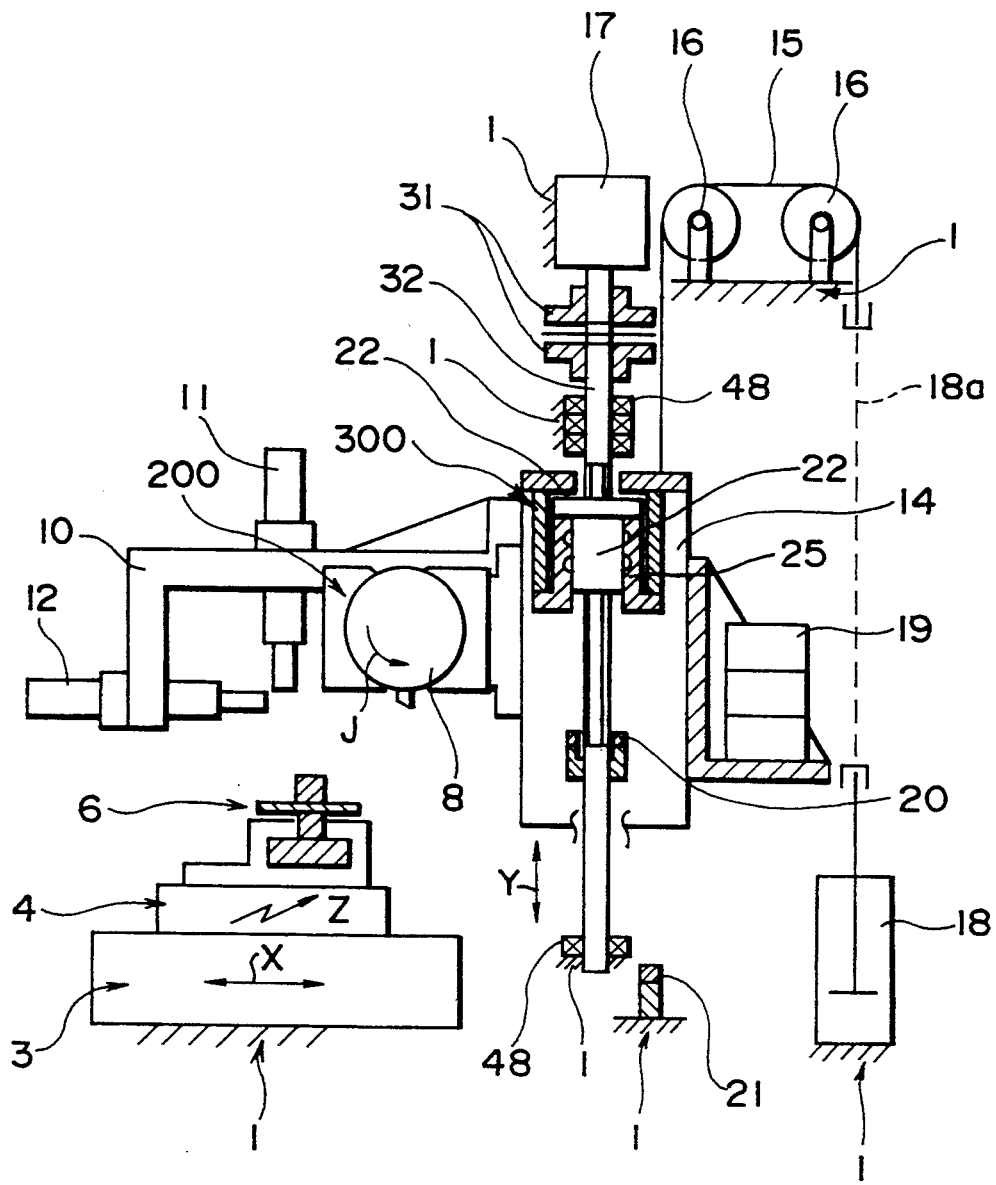
FIG. 2 is a sectional view of a Y up-and-down table.

FIG. 2 is a sectional view showing the vertical driving arrangement of the Y up-and-down table. In FIG. 2, in order to precision-drive the Y up-and-down table 14 in the direction of the arrow Y in FIG. 2, one-end portions of the steel belts 15, which are respectively turned over and guided by the two pairs of pulleys 16 pivotally and axially supported on the ceiling portion of the base 1, are fixed to the Y up-and-down table 14. The other end portion of each steel belt 15 is coupled, through a chain 18a, to an actuator of the hydraulic cylinder 18 fixed to the base 1.

A balance weight 19 balanced with the weight of the above-mentioned spindle unit 200 is placed and fixed on the Y up-and-down table 14. The hydraulic cylinder 18 is connected to a hydraulic circuit (to be described later) for balancing the spindle unit 200 and the Y up-and-down table 14 fixed with the balance weight with each other in the direction of the arrow Y.

A driving means of the Y up-and-down table 14, which is vertically driven while maintaining a balanced state on the base 1 comprises a ball screw nut 22, threadably engaged with a ball screw shaft 32 which receives, through couplings 31, driving power from the output shaft of an up-and-down driving motor 17 fixed on the ceiling portion of the base 1, for converting rotation into a reciprocal motion. For this purpose, the two end portions of the ball screw shaft 32 are pivotally supported by the base 1 through bearings 48.

The ball screw nut 22 is incorporated in and held by a notched hinge-like coupling 300. The ball screw nut 22 and the Y up-and-down table 14 are coupled using the coupling 300. When the vertically driven Y up-and-down table 14 overruns downward, it is stopped by contacting a stopper 21 fixed to the base 1. In addition, a stopper 20 fixed midway along the ball screw shaft 32 and having an outer diameter smaller than that of the ball screw nut 22 directly contacts the ball screw nut 22 to stop it. Thus, a notched hinge 25 can be prevented from receiving a compressive load, and can be prevented from being damaged.

Figure 3:
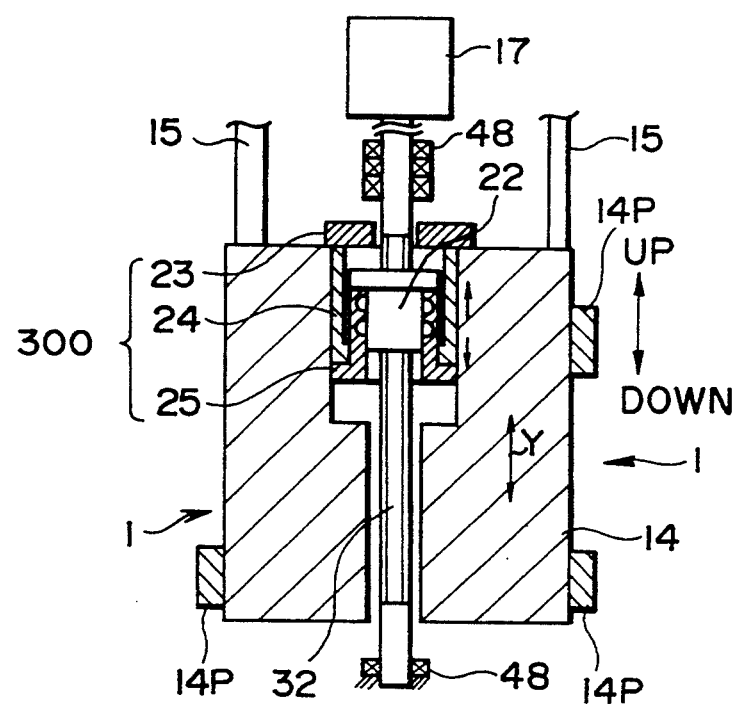
FIG. 3 is a sectional view of a coupling 300.
Figure 4:
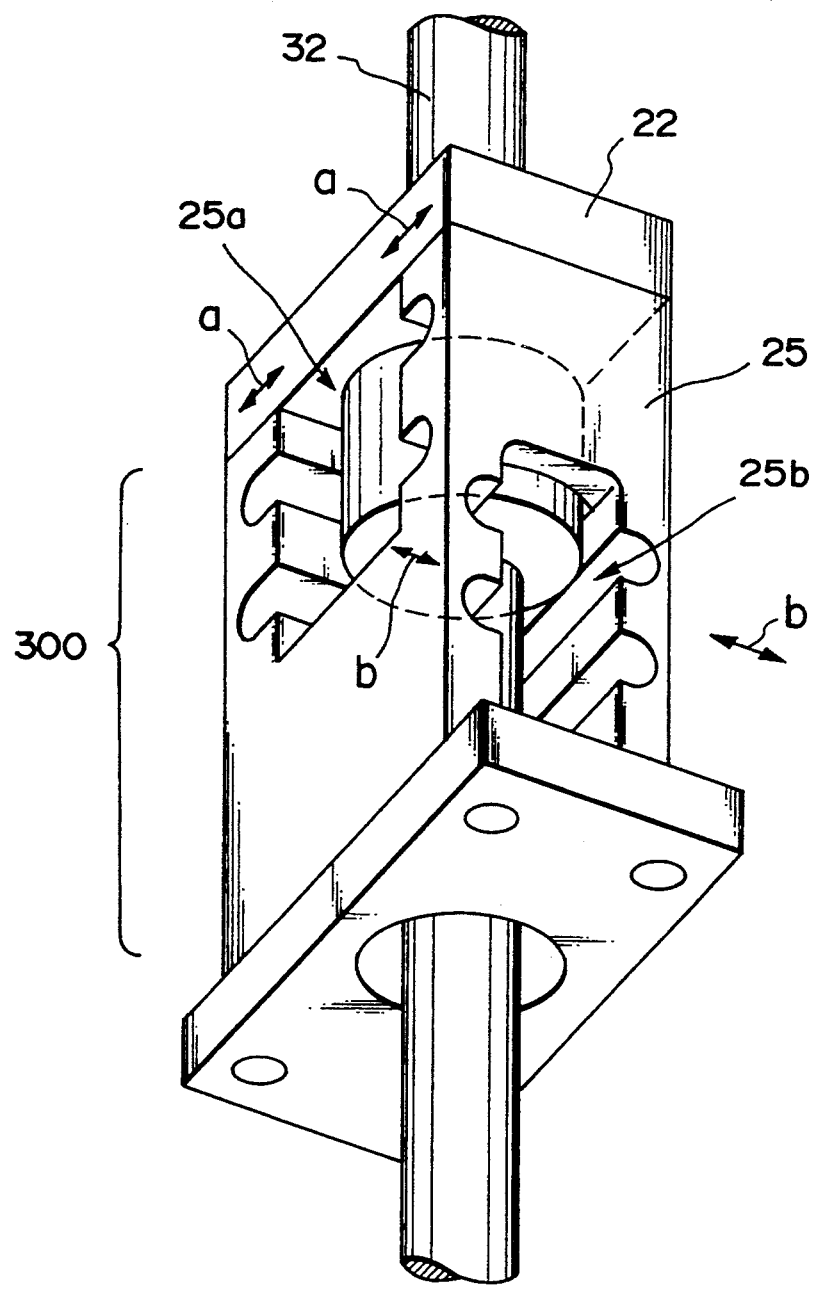
FIG. 4 is an enlarged perspective view of the coupling 300.
Figure 5A:
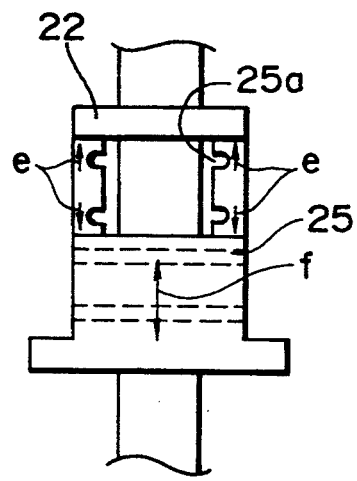
FIG. 5A is a sectional view showing a force acting on the coupling.
Figure 5B:
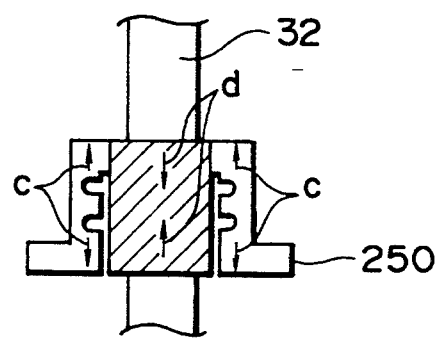
FIG. 5B is a sectional view showing a force acting on a conventional coupling.
Figure 5C:
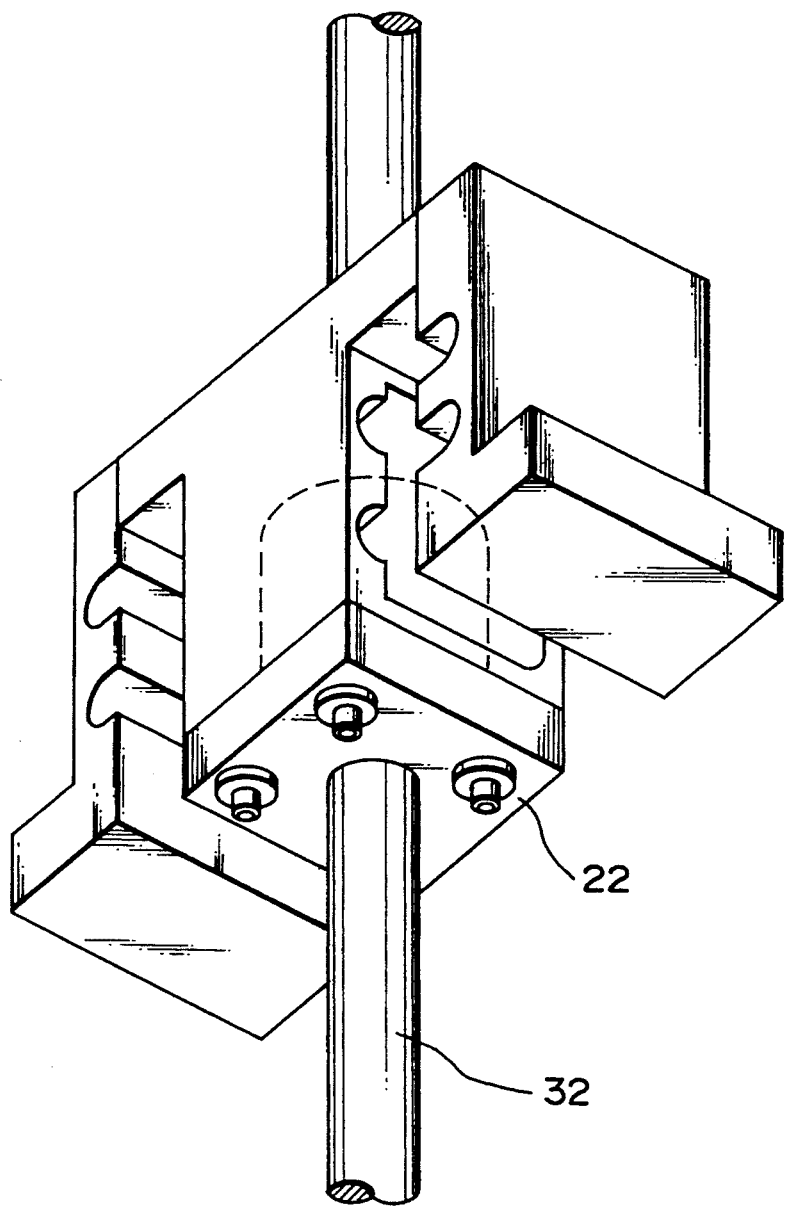
FIG. 5C is a perspective view showing the outer appearance of the coupling 300.

FIG. 3 is a main part sectional view when the Y up-and-down table 14 is viewed from the front side, and illustrates the schematic arrangement of the coupling 300. FIG. 4 is a perspective view showing the outer appearance of the notched hinge 25 constituting the coupling 300 shown in FIG. 3, and FIGS. 5A and 5B are views for explaining the operation of the notched hinge 25. In FIGS. 3 and 4, the Y up-and-down table 14 is guided in the vertical direction (arrow Y) by plate bearings 14p embedded in the base 1 in an anti-cluttering state, and the above-mentioned pair of steel belts 15 are fixed on the upper end portion of the Y up-and-down table 14, thereby maintaining a balanced state.

In order to transmit driving power from the up-and-down driving motor 17 to the Y up-and-down table 14 vertically guided in this manner, the coupling 300 is fixed to the Y up-and-down table 14 by arranging the notched hinge 25 and upper and side coupling plates 23 and 24. As shown in FIG. 4, opening portions 25a and 25b, having a 90° phase difference therebetween, for absorbing whirling of the incorporated ball screw nut 22 in directions of arrows a and b are integrally formed in the notched hinge 25. These opening portions are elastically deformed to absorb external forces of whirling.

FIG. 5B illustrates a parallel type notched hinge for the purpose of comparison. Although the notched hinge shown in FIG. 5B has a smaller storage space than the above-mentioned notched hinge 25, when the ball screw shaft 32 is inserted in the notched hinge, as shown in FIG. 5B, a tensile load acts in directions of arrows c, and a large compressive load acts in directions of arrows d. As a result, a notched hinge 250 may be damaged. Thus, when the series type notched hinge 25, which is elongated in the longitudinal direction of the ball screw shaft 32, as shown in FIG. 5A, is employed, equal tensile loads act in directions of arrows e and f in FIG. 5A. Thus, no buckling load acts on the notched hinge 25, and the notched hinge 25 can be prevented from being damaged.

Figure 6:
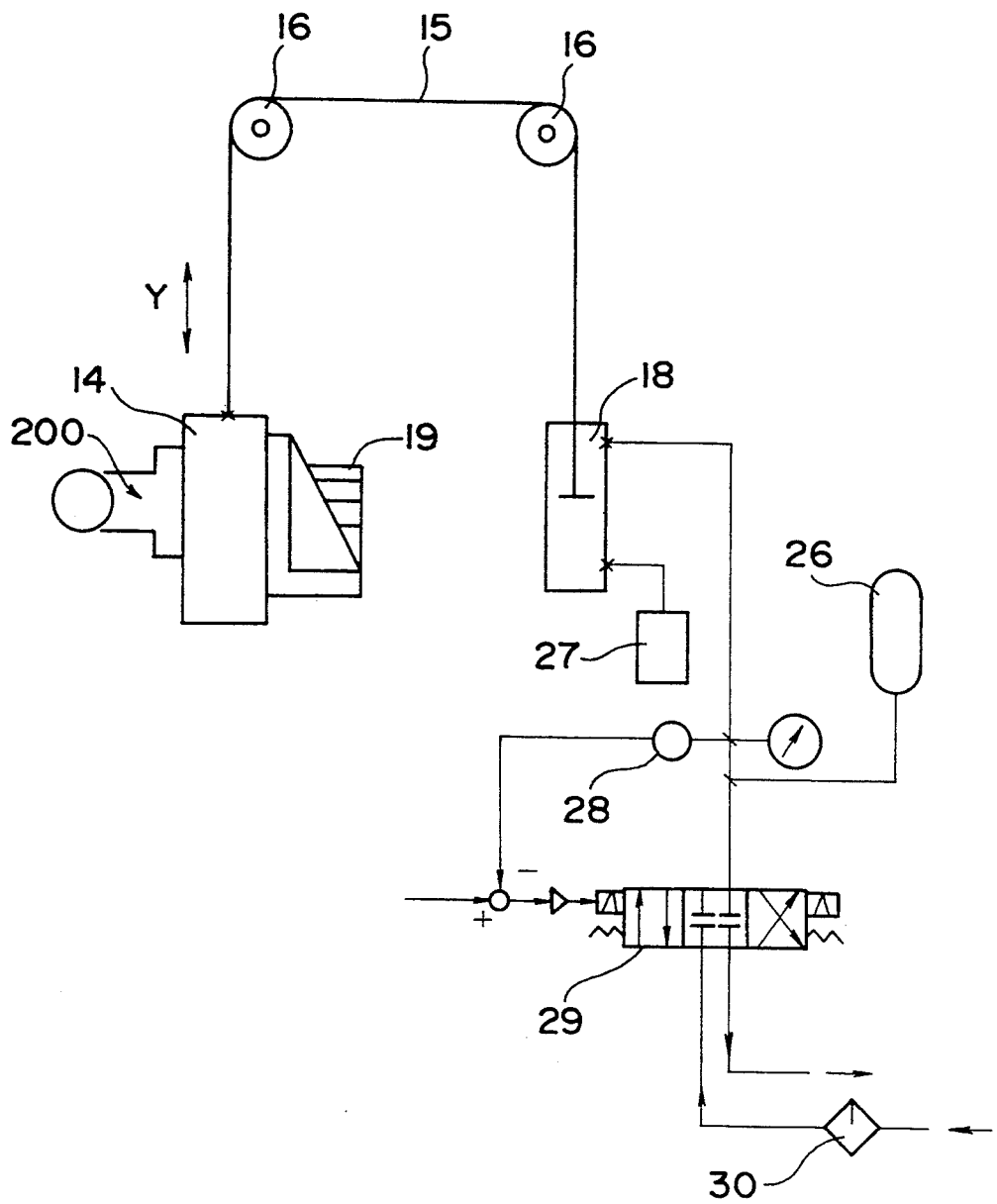
FIG. 6 is a diagram showing a piping system of the Y up-and-down table 14.

FIG. 6 is a diagram showing a piping system of the hydraulic cylinder 18, and illustrates an arrangement for maintaining a constant pressure to be supplied to the hydraulic cylinder 18 so as to stably drive the Y up-and-down table 14 in the vertical (Y) direction. As shown in FIG. 6, a hydraulic tank 27 communicates with one chamber formed by a piston of the hydraulic cylinder 18. The other chamber formed by the piston is connected to a piping system for maintaining a constant supply pressure by a servo valve 29. In this piping system, an accumulator 26, a pressure sensor 28, and a filter 30 are connected to the servo valve 29, as shown in FIG. 6.

With the above-mentioned piping system, the pressure sensor 28 measures a pressure, and supplies an instruction of a correction value to the servo valve 29, thereby maintaining a constant pressure to be supplied to the hydraulic cylinder 18. In addition, the accumulator 26 removes pulsations of the pressure to be supplied to the hydraulic cylinder 18.

Arrangement of Spindle Unit 200

Figure 7:
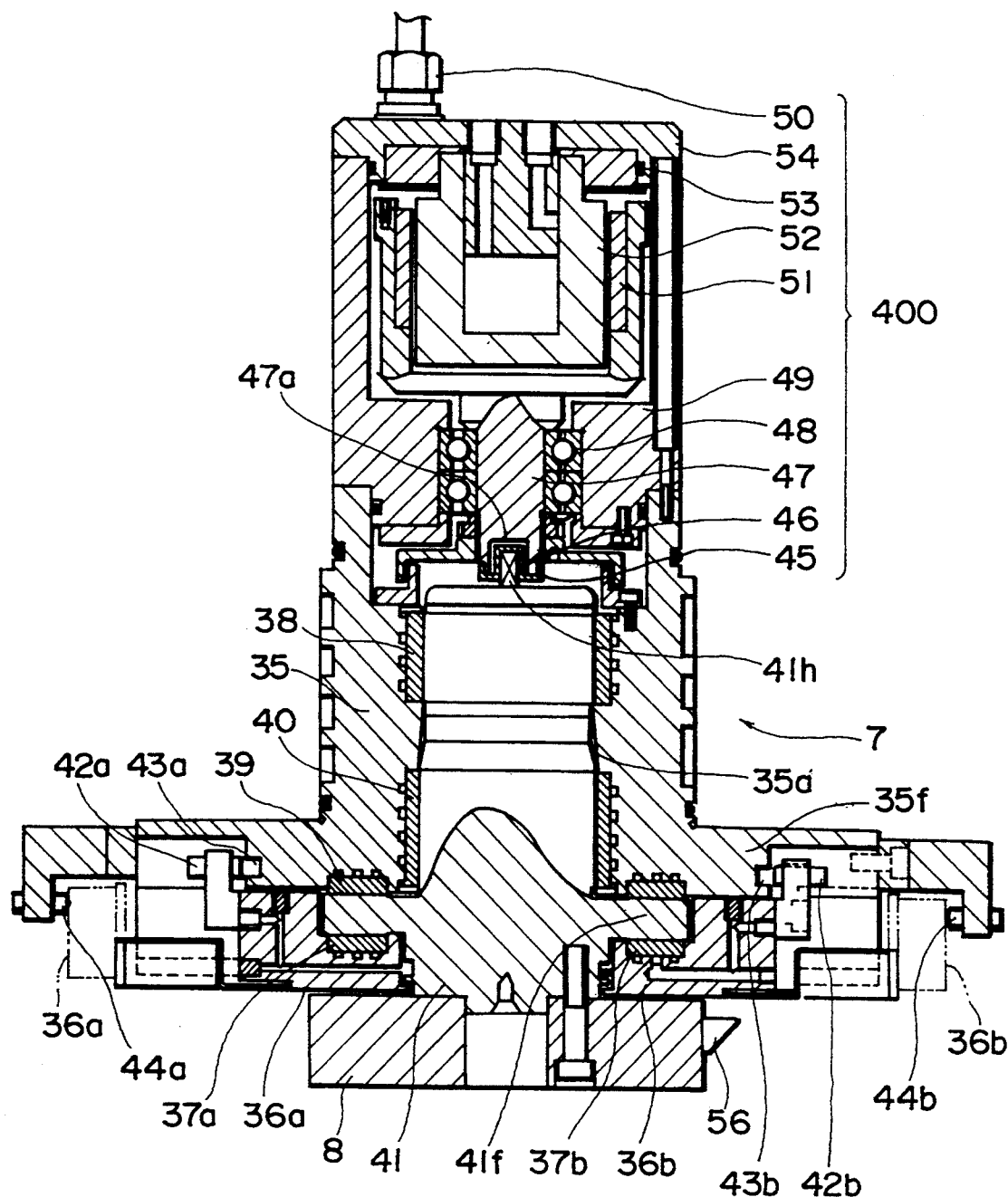
FIG. 7 is a central sectional view of a spindle.

The arrangement of the spindle unit 200 will be described below with reference to the central sectional view of the spindle unit 200 shown in FIG. 7. In FIG. 7, the spindle unit 200 is constituted by the spindle body 7 and a motor portion 400, and a holder shaft 41, which is easily detachable from the rotating shaft of the motor portion 400, is arranged. The cutting tool holder 8 for holding the cutting tool 56 is fixed to one end face of the holder shaft 41 by fastening a bolt, and an engaging portion 41h is integrally formed at the central portion of the other end of the holder shaft 41. The holder shaft 41 transmits a rotational force through the engaging portion 41b. The holder shaft 41 is formed integrally with a flange portion 41f. The flange portion 41f is clamped between sliders 36a and 36b (to be described later) to prevent disengagement in the thrust direction. In addition, when the sliders 36a and 36b are moved in the radial direction of the holder shaft 41, the holder shaft 41 can be inserted/removed.

A housing 35 for supporting the holder shaft 41 is formed with a through hole portion 35a, and is also formed integrally with a flange portion 35f. Cylindrical porous bearings 38 and 40 are embedded in this through hole portion 35a, and a flat disk-like porous bearing 39 is embedded in the side surface of the flange portion 35f, as shown in FIG. 7.

The sliders 36a and 36b are movable along the flange portion 35f between corresponding solid-line positions and broken-line positions, and fix flat disk-like porous bearings 37a and 37b on their corresponding portions, thus holding the flange portion 41f of the holder shaft 41 to sandwich it with the porous bearing 39.

The above-mentioned porous bearings receive pressurized air, and statically support the holder shaft 41 with respect to the housing 35 in a non-contact manner.

Stoppers 42a and 42b are respectively fixed to the sliders 36a and 36b, and stoppers 44a and 44b are fixed on the outer circumferential surface of the flange portion 35f of the housing 35. When the holder shaft 41 is inserted/removed, the sliders 36a and 36b are manually operated to be linearly driven while their positions are regulated by these stoppers 43a, 43b, 44a, and 44b.

The motor portion 400 is constituted as a built-in motor 400. A rotor 47 incorporated in a housing 49, and rotationally supported by the bearing 48 is formed with an engaging hole 47a to be engaged with the engaging portion 41h of the holder shaft 41. A coupling plate 45 and a coupling rubber sheet 46 are arranged in the engaging hole 47a, as shown in FIG. 7.

A lid 54 fixed with a cable connector 50 is attached to the housing 49, and a magnet 51 is fixed to the rotor 47. A rotating magnetic field is generated in a stator coil 52 fixed to the lid 54, thereby rotating the rotor 47. The lid 54 is attached through an O-ring 53 to be able to hold an air-tight state. Since the housing 49 is attached to the housing 35 using bolts, the built-in motor 400 can be easily detached from the spindle body 7 by removing these bolts.

Figure 8:
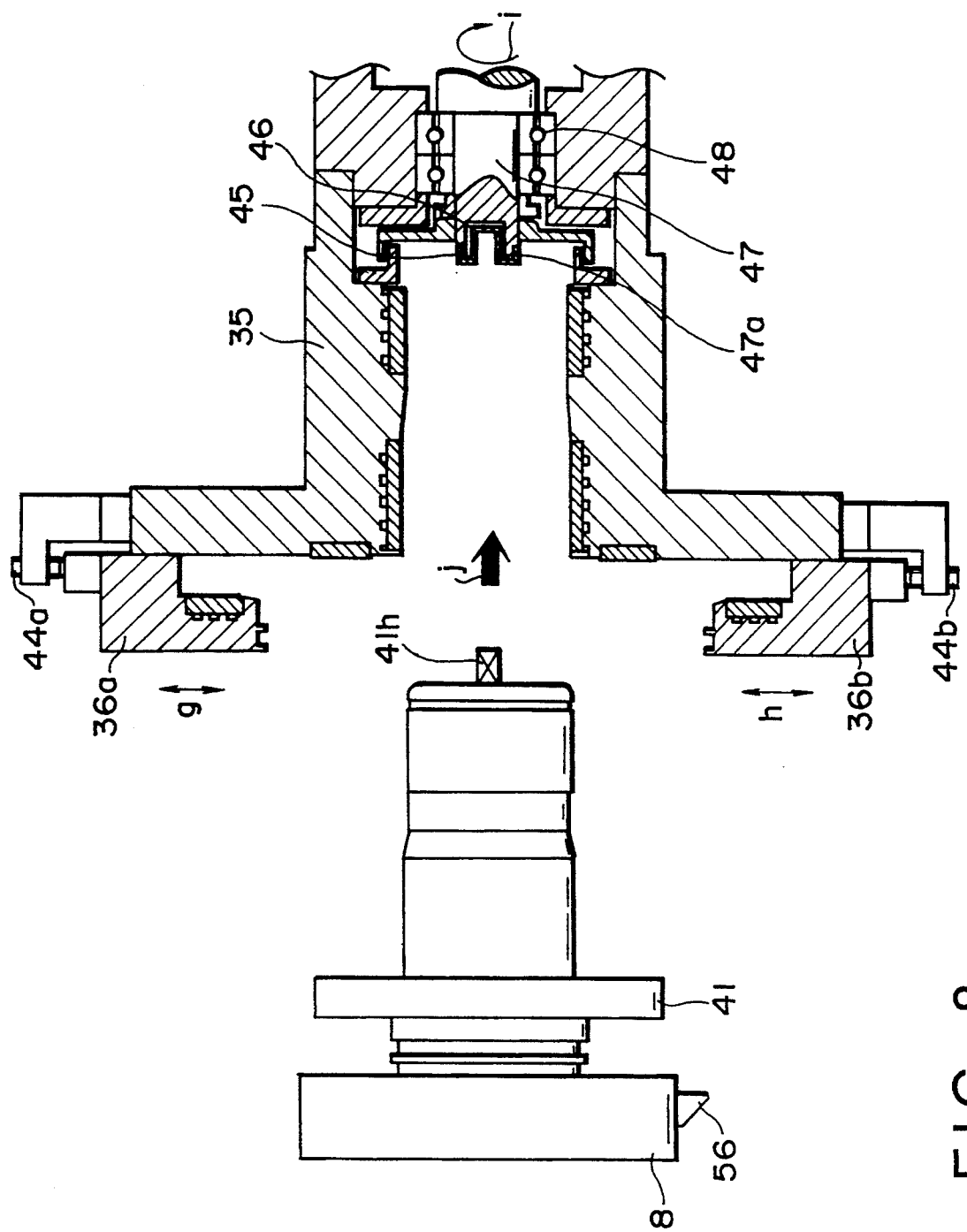
FIG. 8 is a view for explaining a mounting operation of the spindle.

FIG. 8 is an explanatory view of an insertion/removal state of the holder shaft 41, and illustrates a state wherein the holder shaft 41 is detached in a direction of an arrow j. As described above, since the sliders 36a and 36b are linearly moved in directions of arrows g and h (FIG. 8), when the sliders are moved outwardly until they contact the corresponding stoppers 44a and 44b, the holder shaft 41 can be exchanged.

Since the outer circumferential surface of the holder shaft 41 is chromium-plated, it is not easily scratched, and a rotating force i of the built-in motor 400 is transmitted to the holder shaft 41 by the coupling plate 45 via the coupling rubber sheet 46.

Figure 9:
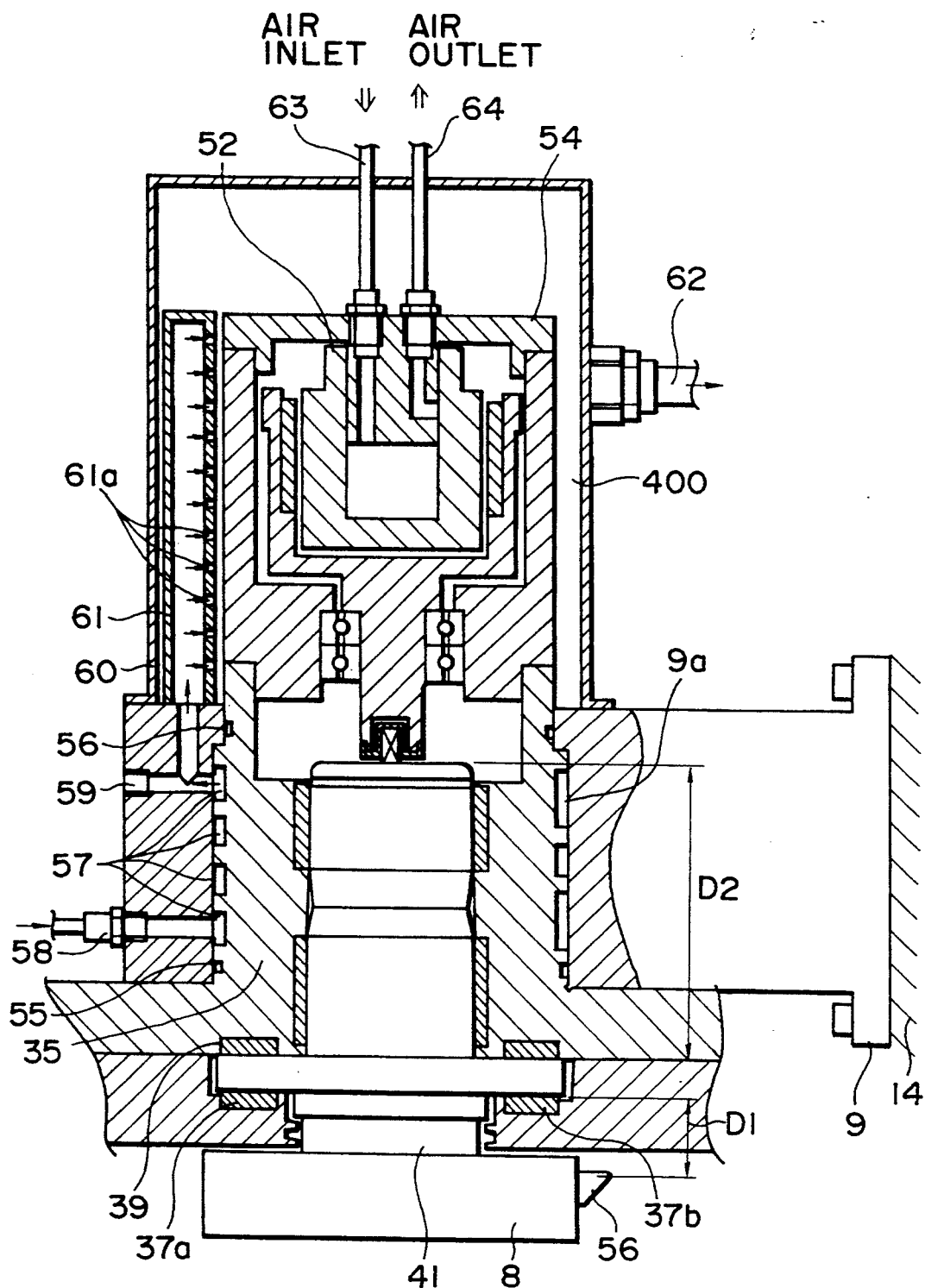
FIG. 9 is a sectional view of the spindle.

FIG. 9 is a sectional view of a cooling arrangement portion of the spindle unit. A spiral oil groove 57 is formed on the outer circumferential surface of the housing 35. The housing 35 is inserted in a hole portion 9a formed in the bracket 9 through O-rings 55 and 56, and is then fixed. An oil pipe port 58 and an embedded plug screw 59 are provided to communicate with the hole portion 9a. A cover 60 is fixed to the bracket 9 to cover the built-in motor 400, and a shower box 61 formed with a large number of hole portions 61a in its bottom portion is arranged in the cover 60. The shower box 61 has one closed end, and its mounting end portion communicates with the oil pipe port 58, as shown in FIG. 9. A drain hose 62 is provided to the bottom portion of the cover 60 to drain oil. Furthermore, a cooling air pipe inlet port 63 and a cooling air pipe outlet port 64 are fixed to the above-mentioned lid 54.

With the above-mentioned arrangement, the oil, which is controlled to a predetermined temperature, is circulated in the oil groove 57 via the oil pipe port 58 to cool the housing 35, and is also supplied into the shower box 61 to be poured onto the entire outer surface of the built-in motor 400. Thereafter, the oil stored in the bottom portion of the cover 60 is drained through the drain hose 62. Cooling air is injected from the cooling air pipe inlet port 63 toward the stator coil 52, and is exhausted from the cooling air pipe outlet port 64.

As described above, since the holder shaft 41 is statically supported by the porous bearings 37a, 37b, and 39, even when the housing 35 thermally expands due to heat generated by the built-in motor 400, the holder shaft 41 is not influenced by a change in dimension caused by thermal expansion within a range D2 in FIG. 9. As a result, the position of the cutting tool 56 for a cutting process is not influenced by thermal expansion. The change in dimension of the holder shaft 41 itself caused by thermal expansion is minimized by minimizing dimensions within the range D1 in FIG. 9, thereby minimizing the displacement of the position of the cutting tool 56. When the holder shaft 41, the cutting tool holder 8, and the cutting tool 56 are formed of a low thermal expansion alloy, the influence of thermal expansion can be further eliminated.

Arrangement of Z Cutting Table 4

Figure 10:
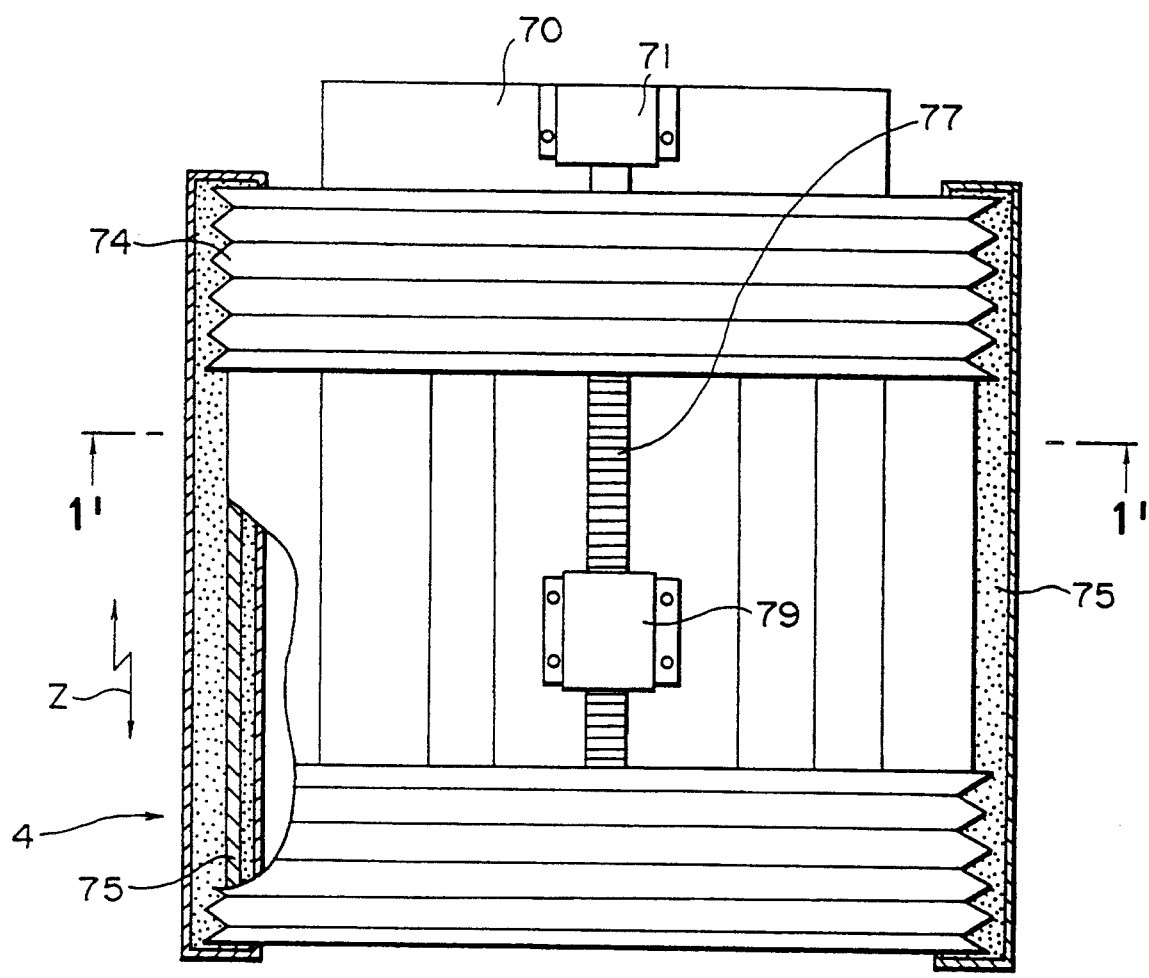
FIG. 10 is a plan view of a Z cutting table 4.
Figure 11:
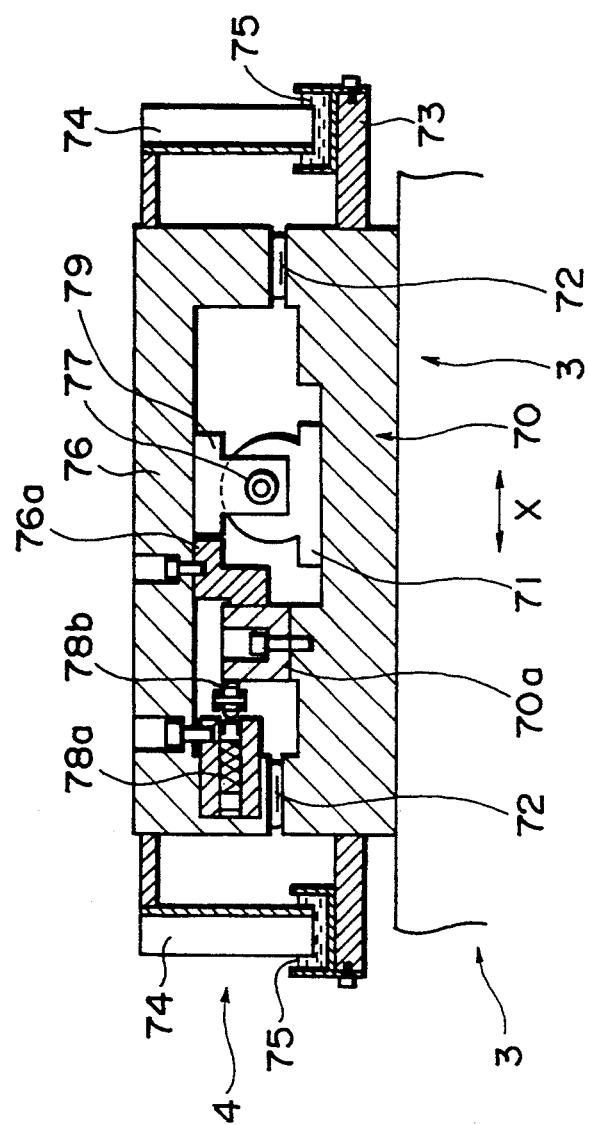
FIG. 11 is a sectional view of the Z cutting table 4.

The arrangement of the Z cutting table 4 fixed on the X feed table 3 described above with reference to FIG. 1 will be described below. FIG. 10 is a partially cutaway plan view of the Z cutting table 4. FIG. 11 is a sectional view taken along a line 1'-1' in FIG. 10. In FIG. 10, the work holder for holding a work is fixed on a movable slide 76 of the Z cutting table 4, and is fed in the Z direction.

The movable slide 76 is guided on a base 70 fixed on the X feed table 3 to be movable in the Z direction through a plurality of needle rollers 72 (FIG. 11). In a mechanism for driving the movable slide 76 in the Z direction (feed direction), a ball screw block 79 threadably engaged with an output feed screw shaft 77 of a Z motor 71 fixed on the base 70 is fixed to the bottom surface of the movable slide 76 so as to convert the rotation of the Z motor 71 into a linear motion. A guide member 70a having two precision-processed side surfaces is fixed on the base 70. The guide member 70a is sandwiched from both sides by a slide block 76a fixed near the movable slide 76 and a pressing roller 78b pressed by a coil spring 78a so as to be movable in the Z direction in an anti-cluttering state.

Bellows 74 extendable in the Z direction are mounted and fixed on the outer walls of the movable slide 76, as shown in FIGS. 10 and 11, and the lower end portion of the bellows 74 is dipped in an oil stored in an oil bath 75 provided near the base 70. In this manner, entrance of dust and cutting powder through a gap between the movable slide 76 and the base 70 is prevented.

The X feed table 3 for performing a feed operation in the X direction in a cutting process has substantially the same arrangement as that of the Z cutting table 4.

Arrangement of Work Holding Portion

Figure 12:
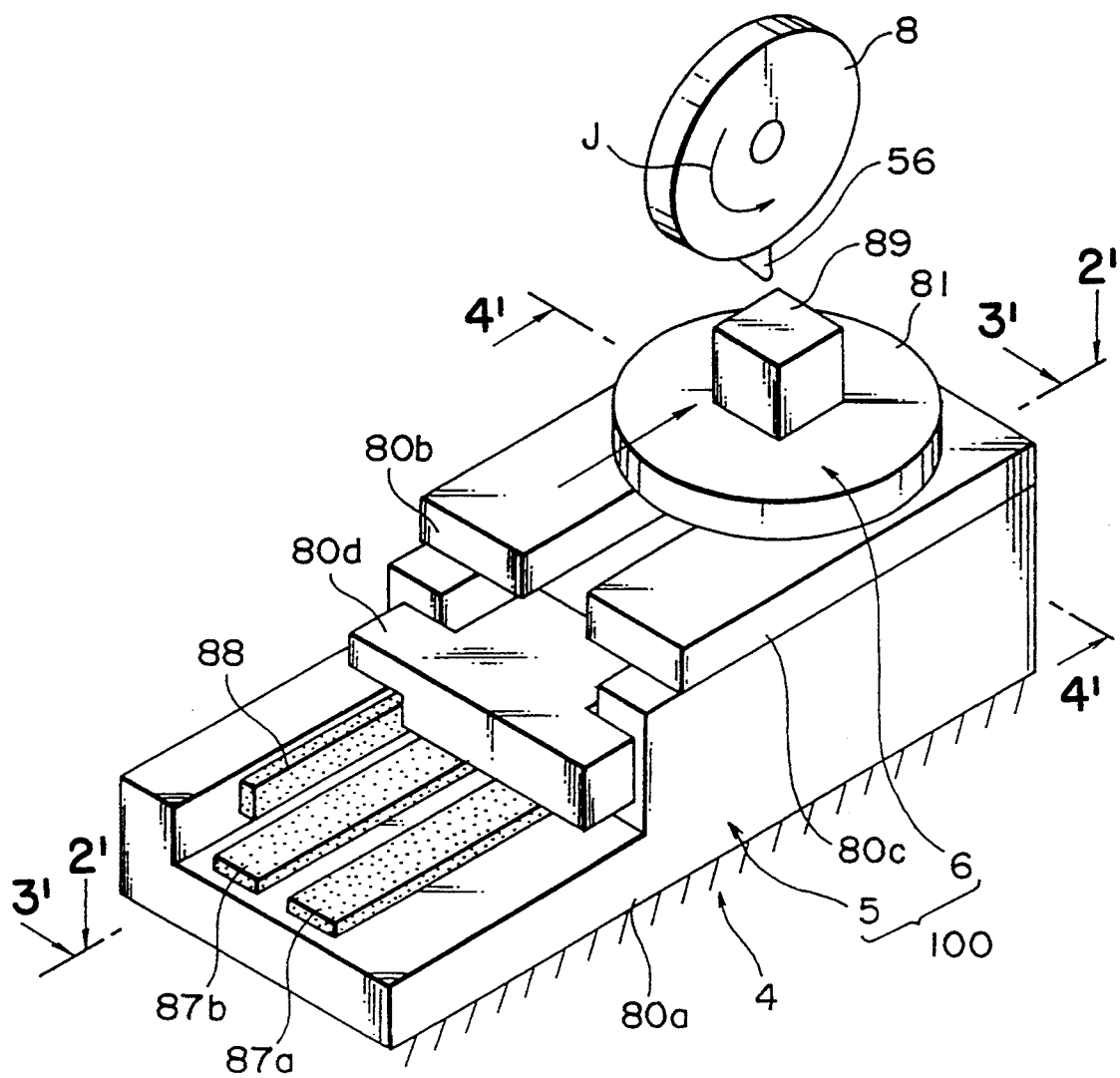
FIG. 12 is a perspective view of an embodiment of a work holding portion.
Figure 13:
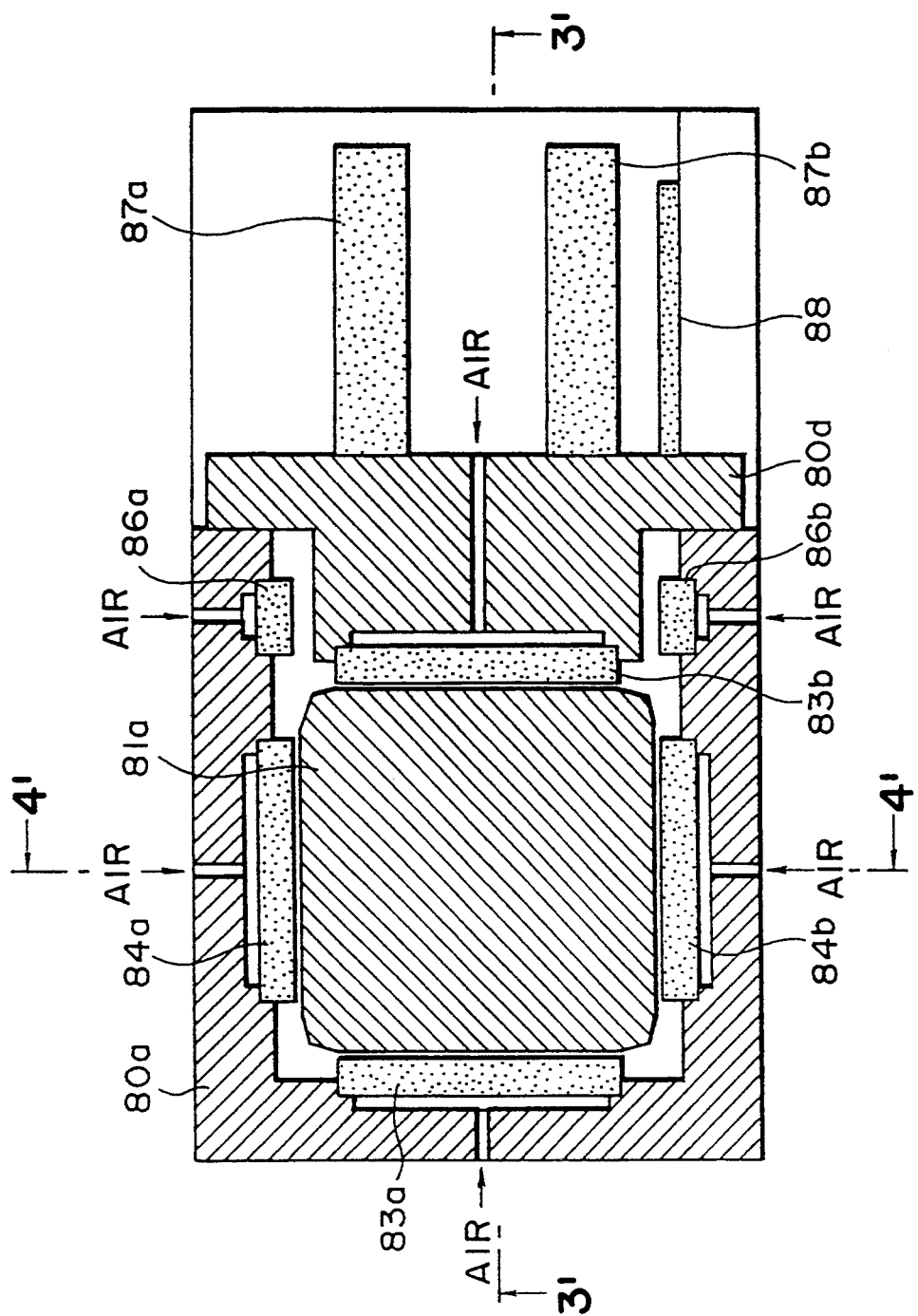
FIG. 13 is a sectional view taken along a line E—E in FIG. 12.

FIG. 12 is a perspective view showing the outer appearance of an embodiment of the work holding portion 100. As will be described later, the work holding portion 100 is constituted by the detachable holder 6 and the bearing portion 5 fixed on the Z cutting table 4, and performs a cutting process of a work 89 using the rotating cutting tool 56. FIG. 13 is a sectional view taken along a line 2'—2' of FIG. 12, FIG. 14 is a sectional view taken along a line 3'—3' of FIG. 12, and FIG. 15 is a sectional view taken along a line 4'—4' of FIG. 12.

Figure 14:
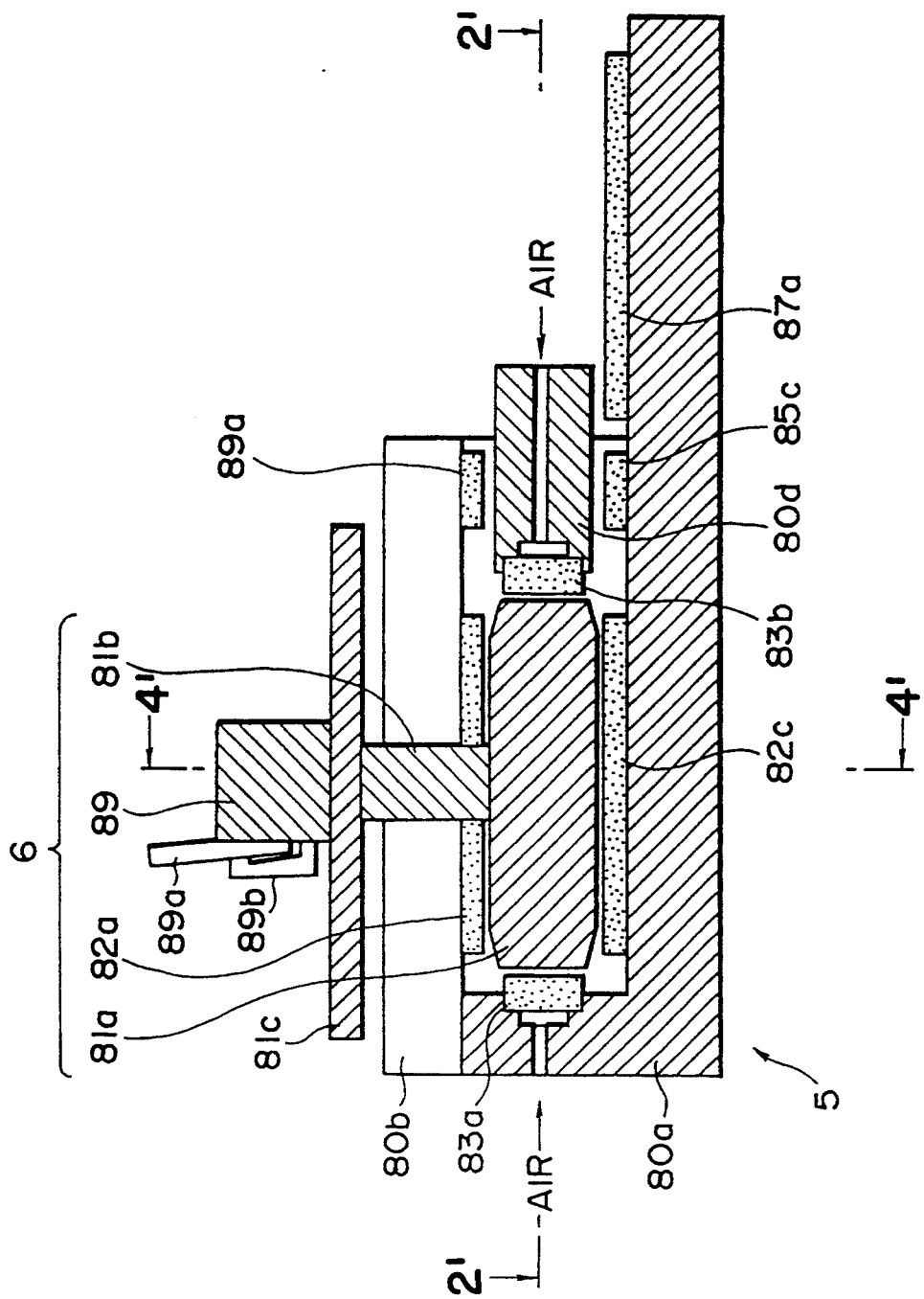
FIG. 14 is a sectional view taken along a line F—F in FIG. 12.
Figure 15:
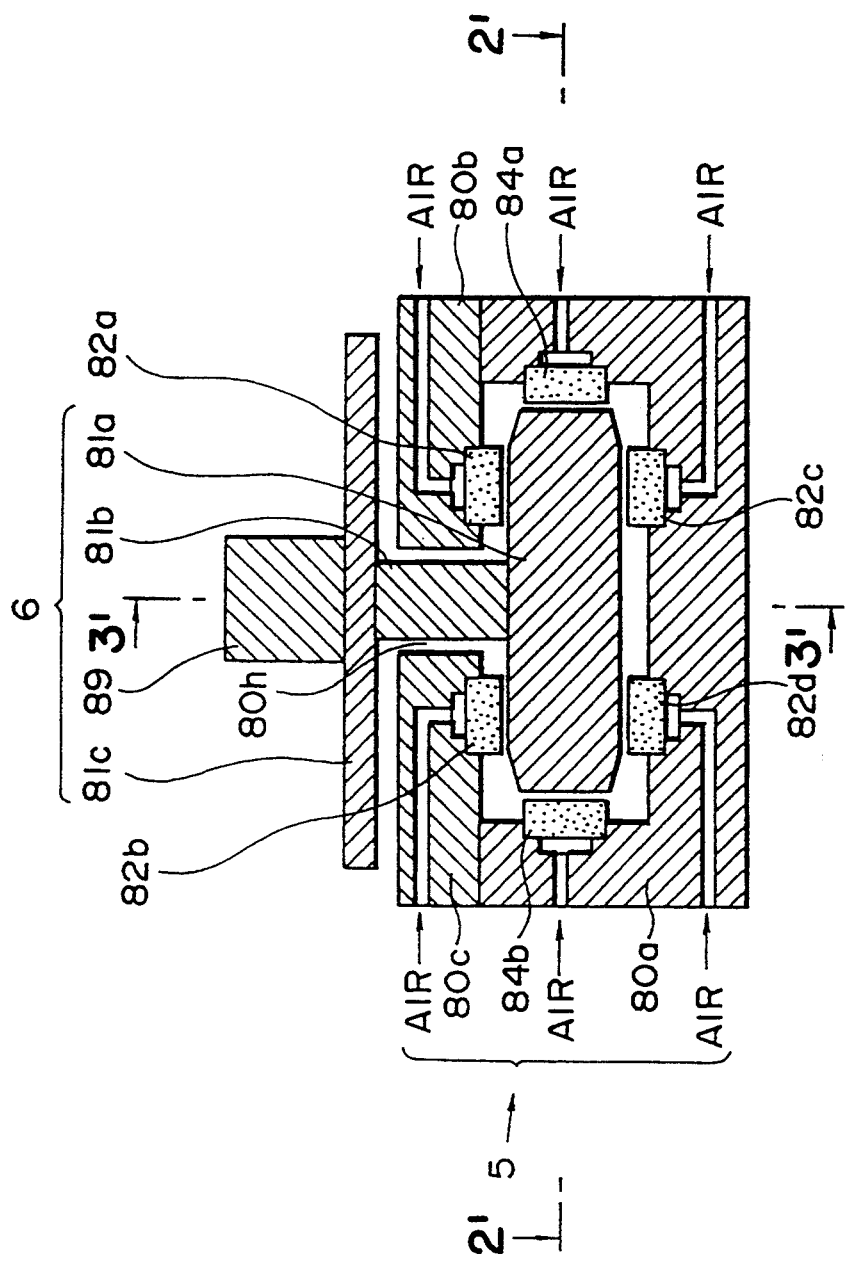
FIG. 15 is a sectional view taken along a line G—G in FIG. 12.

In FIGS. 12, 13, and 14, the holder 6 is integrally constituted by a main body member 81a statically supported by a porous air pad, a work support portion 81b standing upright from substantially the central portion of the main body member 81a, and an upper surface portion 81c for fixing a work. The upper surface portion 81c serves as an attaching surface for the work 89.

As shown in FIG. 12, the bearing portion 5 for exchangeably supporting the holder 6 is constituted by a housing base portion 80a fixed on the table 4, and having an upper opening, housing upper lid portions 80b and 80c fixed to partially close the opening of the housing base portion 80a so as to allow insertion of the work support portion 81b, and a housing side lid portion 80d fixed to the housing base portion 80a to close it after the holder is set at a predetermined position.

A direction to set the holder 6 at the predetermined position of the bearing portion 5 coincides with the rotational direction of the cutting tool 56, so that a dimensional error upon setting of the holder 6 does not influence cutting process precision. Furthermore, in FIG. 12, an air pad 88 is fixed to one side surface of the housing base portion 80a, and a pair of air pads 87a and 87b are fixed to the bottom surface thereof. With the above arrangement, when the holder 6 is guided in a direction of an arrow in FIG. 12, the main body member 81a is placed on the air pads 87a and 87b, and is abutted against the air pad 88, so that the holder 6 can be moved to the predetermined position. Thereafter, the housing side lid portion 80d is fixed to attain a state shown in FIG. 12.

In FIG. 13, the positions of the four side surfaces of the main body member 81a of the holder 6 are regulated by a total of four air pads, i.e., air pads 84a and 84b fixed to the side surface portions of the opening of the housing base portion 80a, an air pad 83a fixed to the abutting portion, and an air pad 83b fixed to the housing side lid portion 80d. In addition, the main body member 81a is statically supported in a non-contact state with respect to the housing base portion by air flowing out through the air pads.

On the other hand, air pads for statically supporting the main body member 81a of the holder 6 in the vertical direction include an air pad 82c fixed on the bottom surface of the housing base portion 80a, and air pads 82a and 82b fixed to the housing upper lid portions 80b and 80c, as shown in FIGS. 14 and 15. When air is supplied to these air pads, the main body portion 81a can be statically supported in the vertical direction in a non-contact state with respect to the housing. With the above arrangement, the holder 6 can be attached/-detached by detaching the housing side lid portion 80d. Since the main body portion 81a can be statically supported by air flowing into small gaps between itself and the air pads 82a to 82c, 83a, 83b, 84a, and 84b, no wear is generated, and high aligning reproducibility can be assured even after attachment/detachment is repeated a number of times.

Since the gaps between the holder 6 and the air pads 82a to 82c, 83a, 83b, 84a, and 84b are very small, it is difficult to directly attach the holder 6 to the housing base portion 80a. For this reason, gap pads 85a, 85b, 86a, and 86b are arranged next to the air pads 87a, 87b, and 88 for guiding the holding 6 to the housing base portion 80a. The air pads 87a, 87b, and 88 serve as guide air pads for urging the holder 6 to adjust its position, while the gap pads 85a, 85b, 86a, and 86b serve to increase gaps between the air pads 82a to 82c, 83a, 83b, 84a, and 84b and the holder 6 so as to allow easy insertion of the holder 6. Thus, the gap pads 85a, 85b, 86a, and 86b serve as aligning pads used when the holder 6 is inserted in the air pads 82a to 82c, 83a, 83b, 84a, and 84b. These gap pads are arranged in the vertical and right-and-left directions, as shown in FIGS. 13 and 14. In this case, the gap pads are arranged to be shifted from each other, so that the holder 6 does not simultaneously pass through the gap pads for adjusting the holder posture in the vertical and right-and-left directions and those for adjusting the holder positions in the vertical and right-and-left directions. In this manner, the holder 6 can be easily guided to the air pads 82a to 82c, 83a, 83b, 84a, and 84b.

Figure 16A:
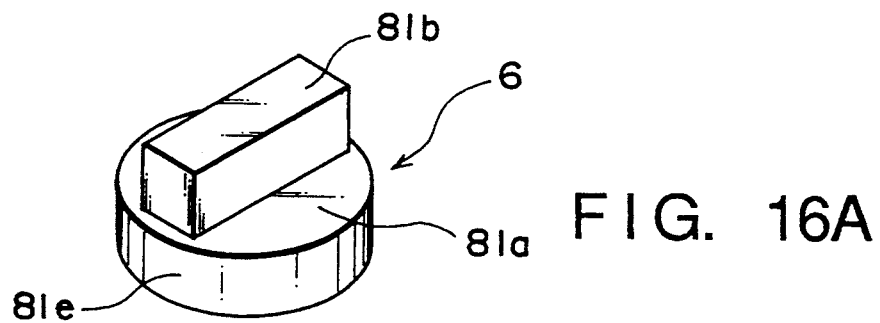
FIG. 16A is a perspective view showing the first modification of a holder.
Figure 16B:
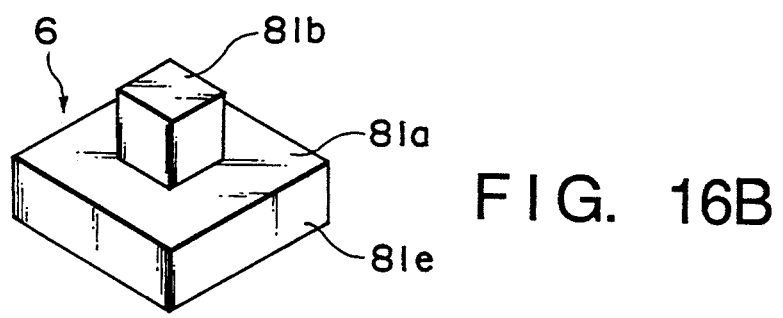
FIG. 16B is a perspective view showing the second modification of the holder.

As described above, since the aligning reproducibility of the holder fixed with a work is high, a work can be set up outside the machine. If given position reproducibility on the process tool side can be assured, even when a plurality of processes of a work must be executed, the work position need not be readjusted every time the process tool is exchanged, thus greatly shortening the setup time. The direction to support the holder 6 by the air pad 83b has lower aligning reproducibility than other support directions since the housing side lid portion 80d attached with the air pad 83b is removed when the holder 6 is attached/detached. However, since this detaching direction coincides with the feed direction of the cutting process, the influence of a decrease in aligning reproducibility on process precision can be reduced. FIGS. 16A and 16B are perspective views showing the outer appearances of the holder 6. FIG. 16A shows a modification wherein the main body member 81a of the holder 6 is formed to be circular, and FIG. 16B shows another modification wherein the main body member 81a is formed to be rectangular. The manufacture of a cylindrical holder shown in FIG. 16A is easier than a polygonal holder, but a rotation-lock mechanism must be added in the former. In the case of a rectangular or polygonal holder having two pairs of parallel side surfaces 81e shown in FIG. 16B, no rotation-lock mechanism is required, and a housing can be rendered compact.

When a square is used as the polygon, the number of mounting directions can be maximized. For example, if a rectangle is used, the number of mounting directions is two. However, if a square is used like in this embodiment, four mounting directions are available. Since the square has a longer outer perimeter than a circle having the same area, the area of air pads for supporting the outer circumferential portions can be increased, and the support strength of the holder can be increased. The outer circumferential portion of the holder 6 is processed to allow easy insertion.

Figure 17A:
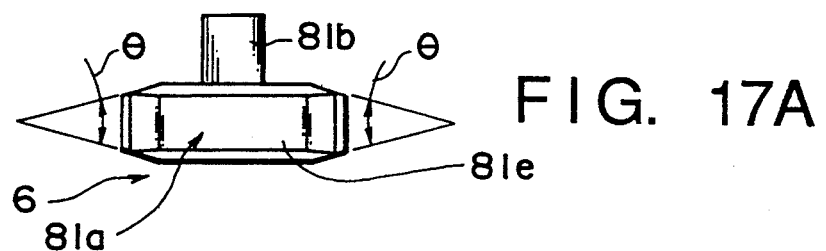
FIG. 17A is a side view of the holder.
Figure 17B:
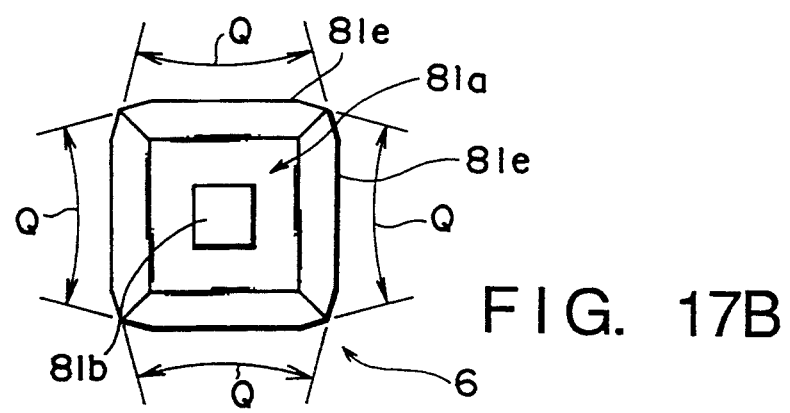
FIG. 17B is a plan view of the holder.

FIG. 17A is a side view of the holder 6, and FIG. 17B is a plan view. In FIG. 17A, each ridge portion of the main body member 81a of the holder undergoes a tapering process of a taper angle. As a result, a self-lock state of the holder upon insertion can be prevented, and easy insertion is allowed. In addition, when the main body member 81a of the holder directly contacts the air pads 82a to 82c, 83a, 83b, and 88, the air pads can be prevented from being damaged. Furthermore, as shown in FIG. 17B, each side surface 81e of the main body member 81a is defined by a large arc Q, thus preventing a self-lock state of the side surfaces.

Figure 18A:
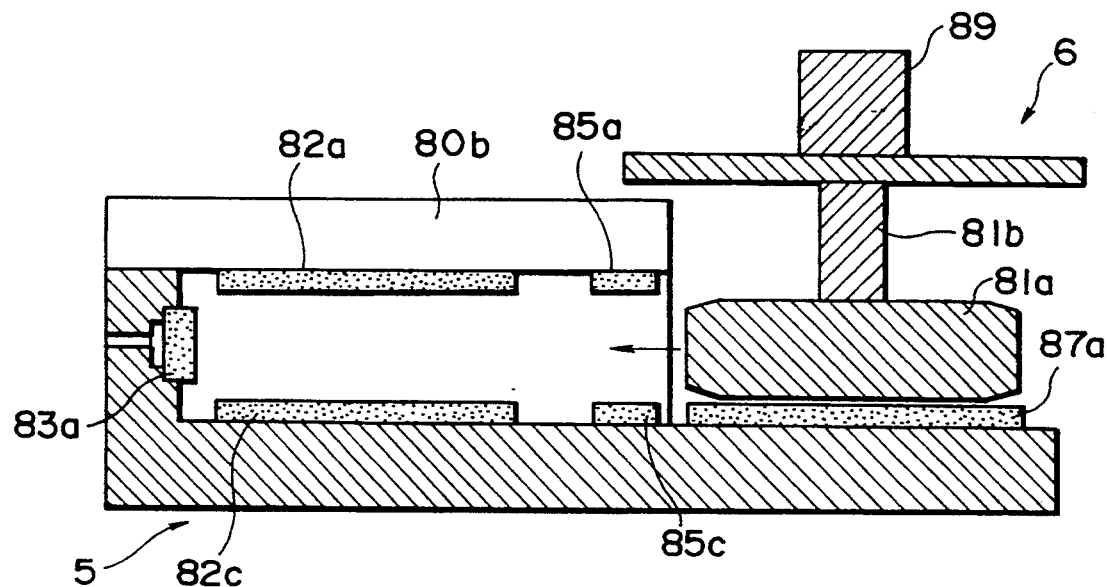
FIGS. 18A, 18B, and 18C are sectional views showing a mounting state of the holder.
Figure 18B:
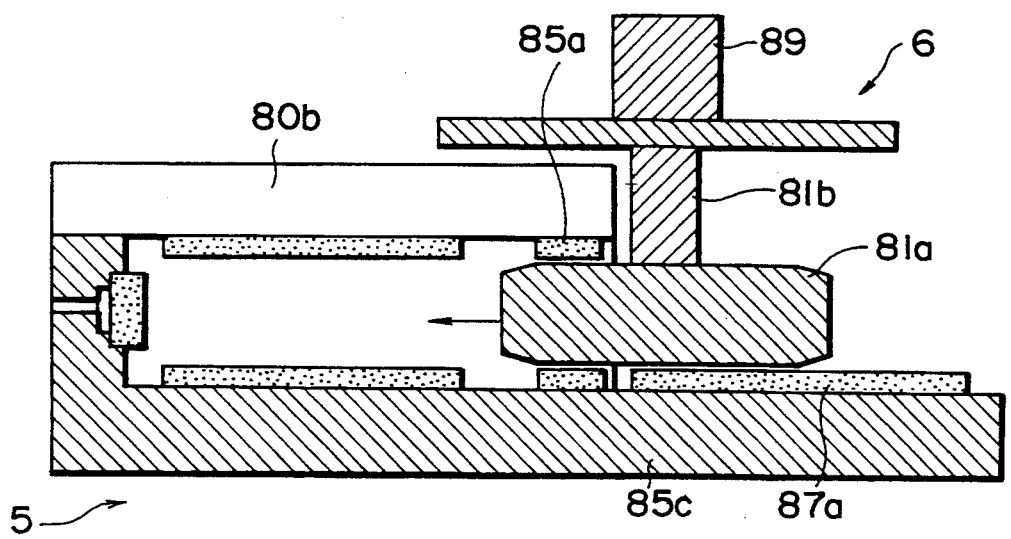
Figure 18C:
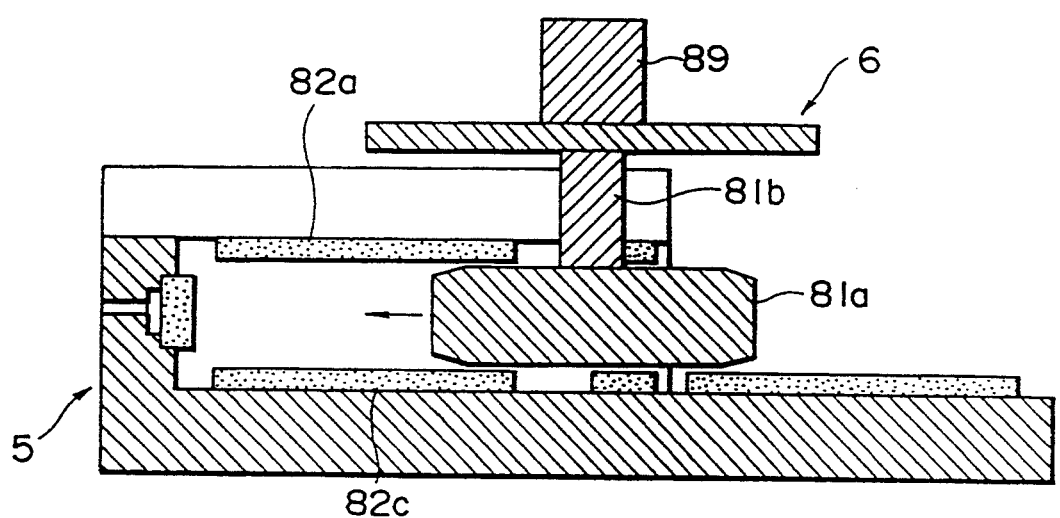

A procedure for inserting and setting the holder 6 in the bearing portion 5 will be described below with reference to FIGS. 18A to 18C. In FIG. 18A, the holder 6 is placed on the air pads 87a and 87b, and its vertical posture is adjusted. When the holder is manually moved in a direction of an arrow in FIG. 18A, the vertical position of the holder is adjusted by the gap pads 85a, 85b, 85c, and 85d. Thereafter, when the holder is further moved, as shown in FIG. 18C, the holder is aligned in the vertical direction by the air pads 82a, 82b, 82c, and 82d. As for the right-and-left direction of the holder 6, the holder 6 is urged against the air pad 88 to adjust its posture in the right-and-left direction, and then passes between the gap pads 86a and 86b. Thereafter, the holder 6 is aligned in the right-and-left direction by the air pads 84a and 84b. Finally, as shown in FIG. 12, the holder 6 is aligned and fixed in the insertion direction by the air pad 83a and the air pad 83b attached to the housing side lid port ion 80d.

As described above, the holder is inserted stepwise while adjusting the posture and position with respect to the corresponding air pads, thus allowing easy insertion. Since the ridge portions of the main body member 81a of the holder are tapered to have the insertion direction as an axis, a self-lock state of the holder can be prevented. When the main body member 81a directly contacts the air pads, the air pads can be prevented from being damaged.

Figure 19:
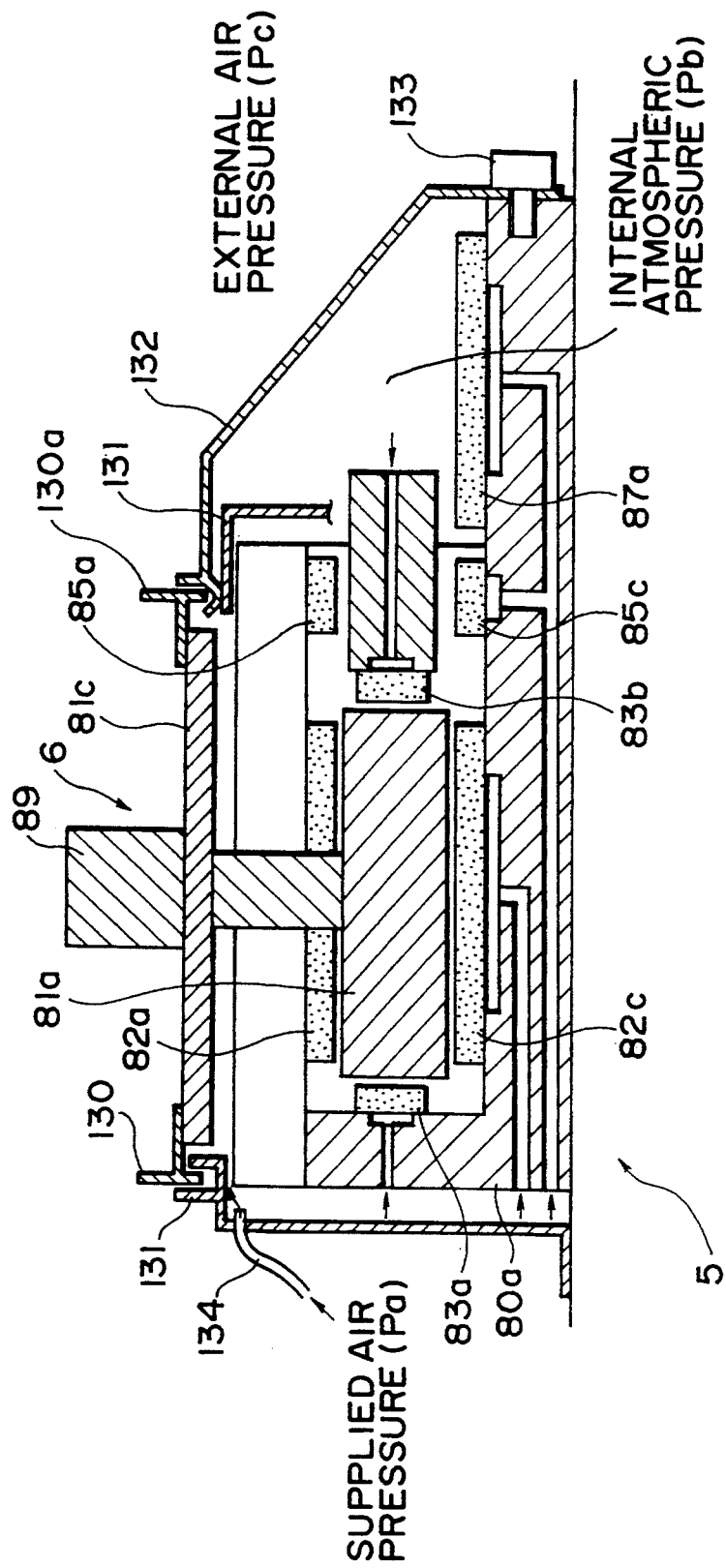
FIG. 19 is a sectional view showing the holder and a bearing portion.

The above-mentioned bearing portion 5 has a countermeasure against entrance of dust or cutting powder. FIG. 19 is a central sectional view of the bearing portion 5 incorporating the holder 6, and the above-described parts are denoted by the same reference numerals. As shown in FIG. 19, a first cover 130 continuously formed with an upright surface 130a is fixed to the outer circumferential edge portion of the work attaching surface (upper surface portion) 81c. On the other hand, second and third covers 131 and 132 are arranged to surround the bearing portion 5. The third cover 132 is detachably arranged on the side surface of the housing base portion 80a using a bolt 133. Groove portions locally extending below the upright surface 130a of the first cover 130 are formed on the second and third covers to assure air-tightness.

Furthermore, the second cover 131 is provided with an air pipe 134 which is obtained by extending a pipe for supplying air to the air pads as another system, and utilizes exhausted air. When a supplied air pressure Pa is supplied into the cover, it flows into the interior of the covers from a gap between the third and first covers 132 and 130, thus obtaining an internal atmospheric pressure Pb.

As a result, an external atmospheric pressure Pc outside the cover becomes lower than the internal atmospheric pressure Pb, but the internal atmospheric pressure Pb becomes lower than the supplied air pressure Pa. As a result, since a relation Pa>Pb>Pc is satisfied, entrance of external dust, oil mist, and cutting powder can be prevented. Therefore, the air pads and the holder main body can always be maintained in an ideal state, thus assuring prescribed precision of the bearing portion 5.

Figure 20:
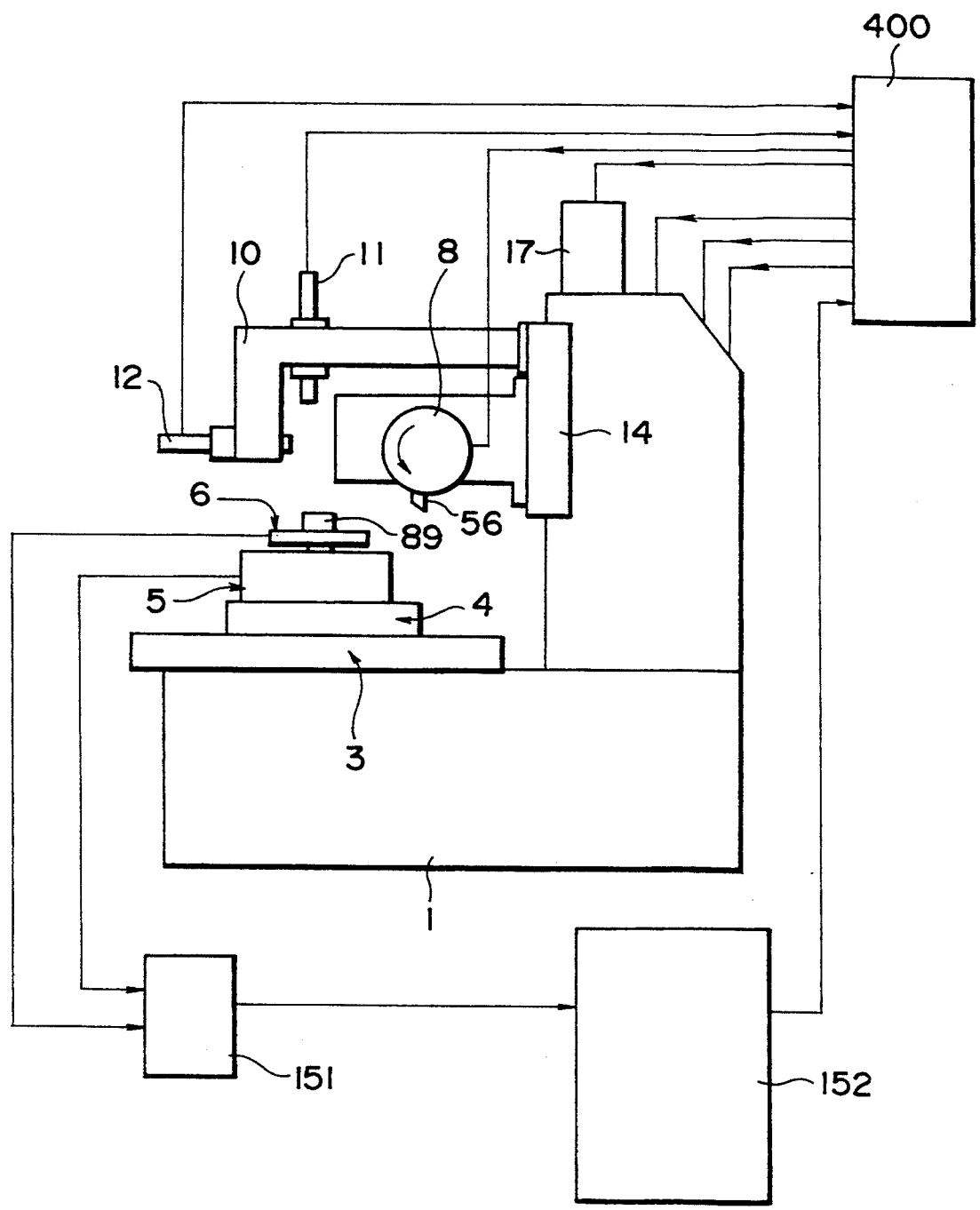
FIG. 20 is a block diagram of the overall device.

The arrangement of an overload detection device 152 connected to the bearing portion 5 and the holder 6 will be described below. FIG. 20 is a block diagram of the overall device. As shown in FIG. 20, the above-described motors are connected to a controller 400 incorporating a driving circuit. On the other hand, an overload detector 151 connected to the overload detection device 152 is connected to the holder 6 and the bearing portion 5 so as to detect an overload generated in a cutting process.

Figure 21:
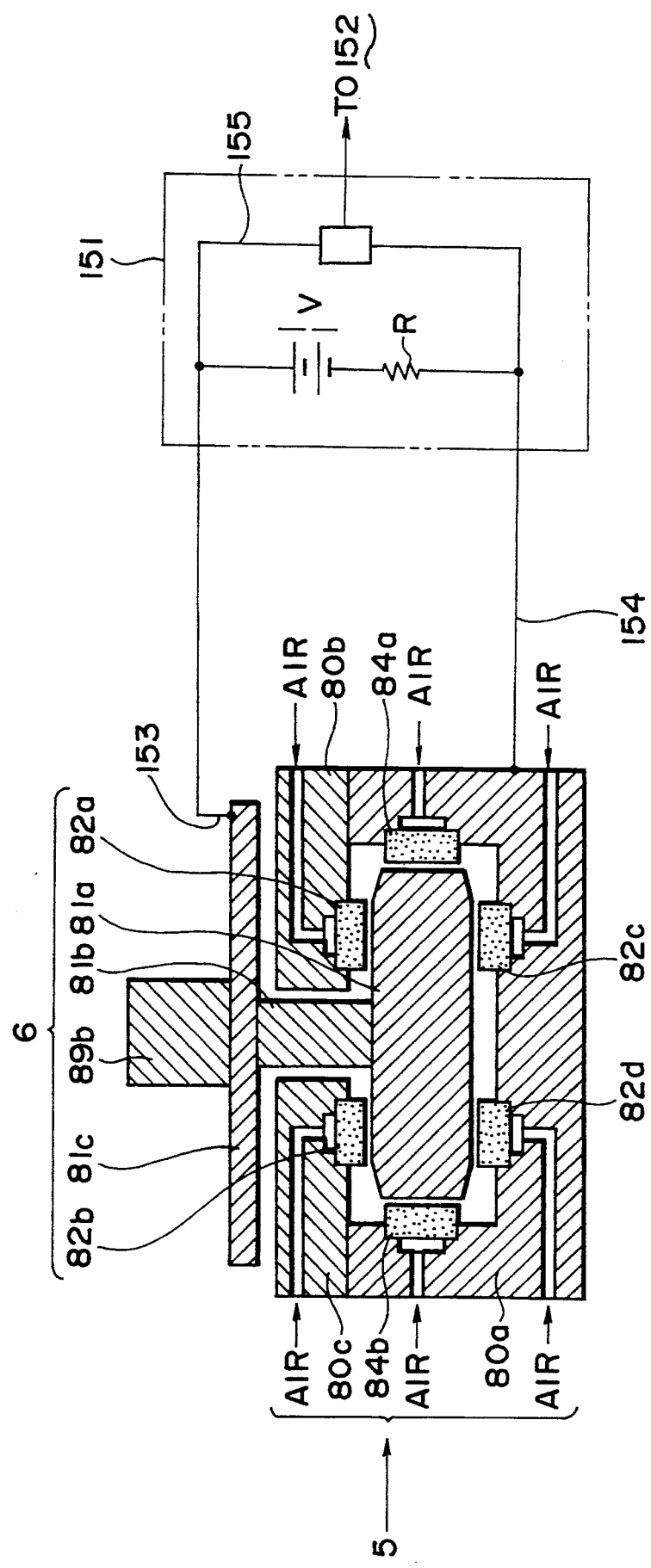
FIG. 21 is a circuit diagram of an overload detector connected to the bearing portion.

FIG. 21 is a circuit diagram of the overload detector 151 connected to the bearing portion 5 and the holder 6. The air pads 82a and 84a of the bearing portion 5 are formed of a conductive porous member such as a graphite-based member, and electrodes 153 and 154 are respectively connected to the bearing portion 5 and the holder 6. The electrodes 153 and 154 are connected to a closed circuit formed by connecting a power supply V and a resistor R in series with each other. The overload detector 151 is constituted by detecting a potential difference between the two electrodes. The overload detector supplies a detection signal to the controller 400 through the overload detection device 152.

With the above-mentioned arrangement, when a certain abnormality occurs during processing of a work, and an external force acts between the holder 6 and the bearing portion 5, the air pads 82a and 84a are brought into contact with each other, and the potential difference between the electrodes 153 and 154 changes. This change is detected as an overload, and is supplied to the overload detection device 152. Thus, the controller 400 generates an abnormality signal, and supplies instructions to the corresponding driving units so as to stop the operations.

Therefore, with the above-mentioned overload detection control, even when an abnormality occurs during cutting of the work, the operations can be interrupted. Therefore, an abnormal factor can be removed to restart the operations. In particular, when the overall machine is controlled by a program, as described above, if a programming error or runaway of the program occurs, the driving units may collide with each other. However, since the above-mentioned overload detection device is arranged, the air pads can be prevented from being damaged. For this purpose, the overload detection device 152 is connected not only to the holder and the bearing portion but also to electrodes provided to the respective driving units.

Arrangement of Microscope Unit

Figure 22:
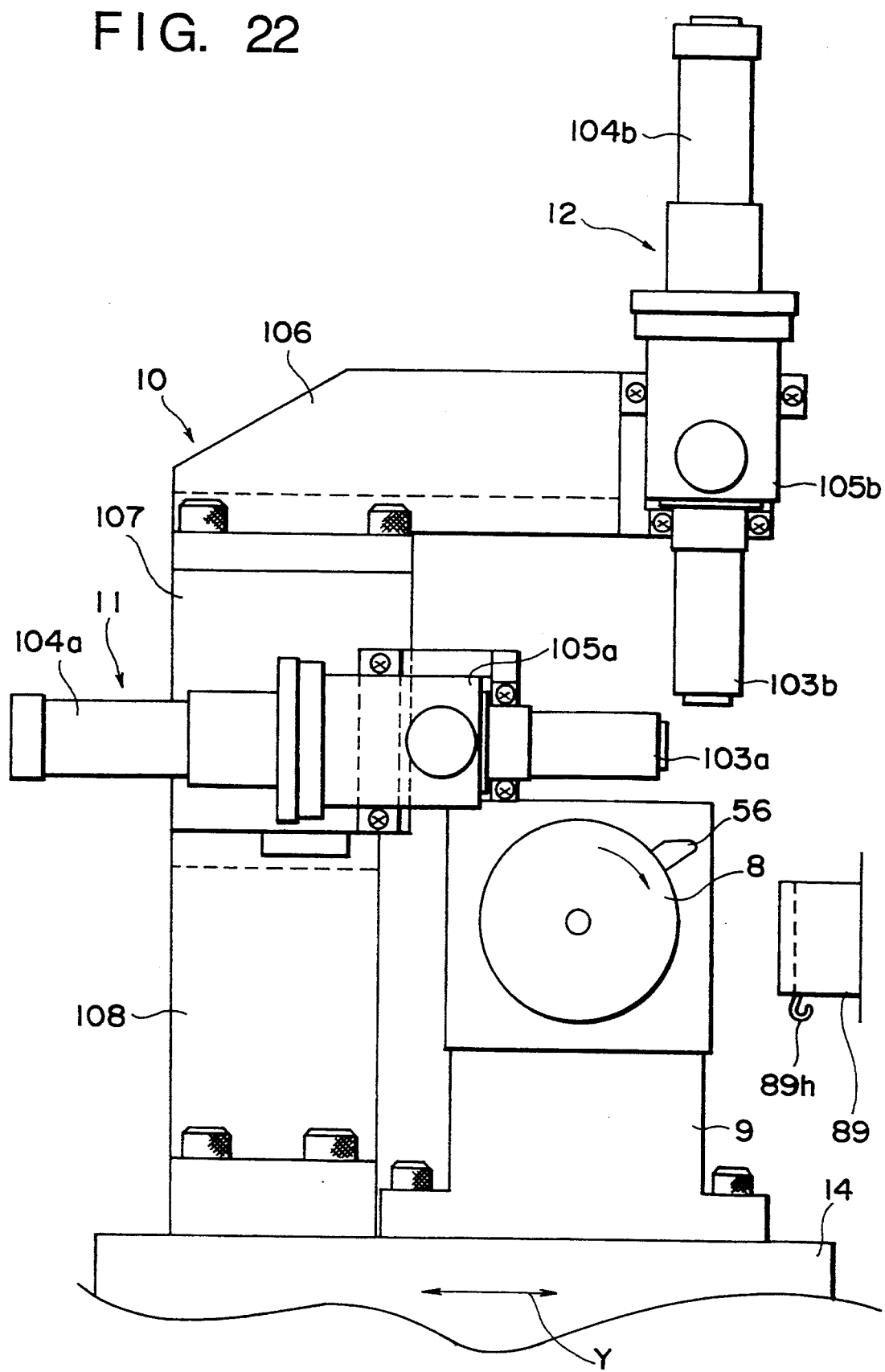
FIG. 22 is a view showing a mounting state of microscopes.

FIG. 22 is a front view showing the mounting state of microscopes. In FIG. 22, on the Y up-and-down table 14 which mounts the above-mentioned spindle unit using the bracket 9 and is vertically driven, vertical and horizontal microscopes 11 and 12 are mounted in the vertical and right-and-left directions using a bracket arranged in addition to the bracket 9.

The vertical and horizontal microscopes 11 and 12 respectively comprise objective lenses 103a and 103b, mounting ports 105a and 105b for optical fibers for transmitting light incident from a light source, and CCD cameras 104a and 104b. These microscopes are fixed on support bases 106, 107, and 108 constituting the bracket 10, and are vertically moved together with the Y up-and-down table 14.

Since the cutting direction for cutting the work 89 using the cutting tool 56 coincides with the rotating direction of the spindle, the horizontal microscope 12 is attached in a direction opposite to the rotating direction of the spindle, so that a burr 89h upon cutting is formed at the side opposite to the microscope 12. As a result, an image of the cut work 89 displayed on a TV monitor through the CCD camera 104b can become a good image free from the burr 89h. The light sources for the microscopes are arranged at positions separated away from the spindle and the microscopes using the optical fibers, thus minimizing thermal expansion due to heat generated by the light source. Furthermore, the spindle and the microscopes are not directly mounted on the single bracket, but are mounted on the table 14 using different brackets, so that the vibration upon rotation of the spindle is not easily transmitted to the microscope unit. Since the microscopes for measuring a work are mounted, as described above, the work can be measured and subjected to a correction process without being detached from the machine.

Description of Operations

Figure 23A:
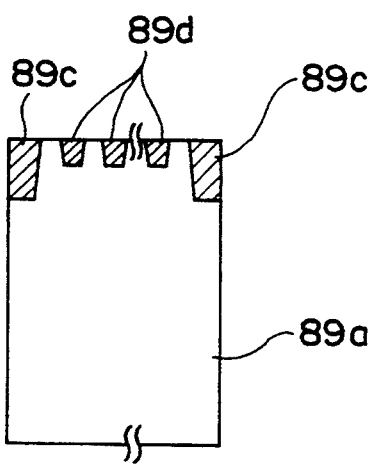
FIGS. 23A and 23B are explanatory views showing a process order of a work.
Figure 23B:
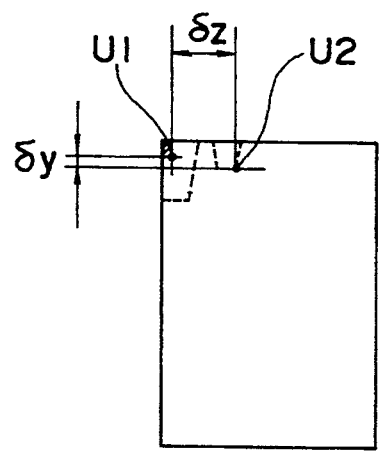

FIG. 23A is a front view of a work 89a to be subjected to full-automatic precision cutting processes, and FIG. 23B is a front view showing the order of precision cutting processes. As shown in FIG. 23A, a plurality of fine grooves 89d indicated by hatching are formed at a predetermined pitch in the upper edge portion of the work 89a by cutting processes. Relief grooves 89c are similarly formed at two sides of the fine grooves 89d by cutting processes. The above-mentioned cutting tool 56 is processed in advance as a forming tool, and the fine groove 89d is formed by a single cutting operation. However, two or more cutting operations may be performed depending on the depth of the fine groove.

As shown in the order of precision cutting processes in FIG. 23B, a trial cutting process is performed such that the right corner portion of the cutting tool 56 is located at a point U1. Thereafter, the position of the point U1 is measured using the horizontal and vertical microscopes. Subsequently, correction values z and y to a pre-input point U2 at the right corner portion at the leftmost position of the fine groove 89d are calculated on the basis of the measurement result of the point U1. Thereafter, the Z cutting table 4, the Y up-and-down table 14, and the like are moved until the right corner portion of the cutting tool 56 coincides with the point U2, and the cutting process of the fine groove 89d is performed. Thereafter, the cutting processes of all the fine grooves 89d are performed while performing a feed operation by a predetermined pitch.

Figure 24:
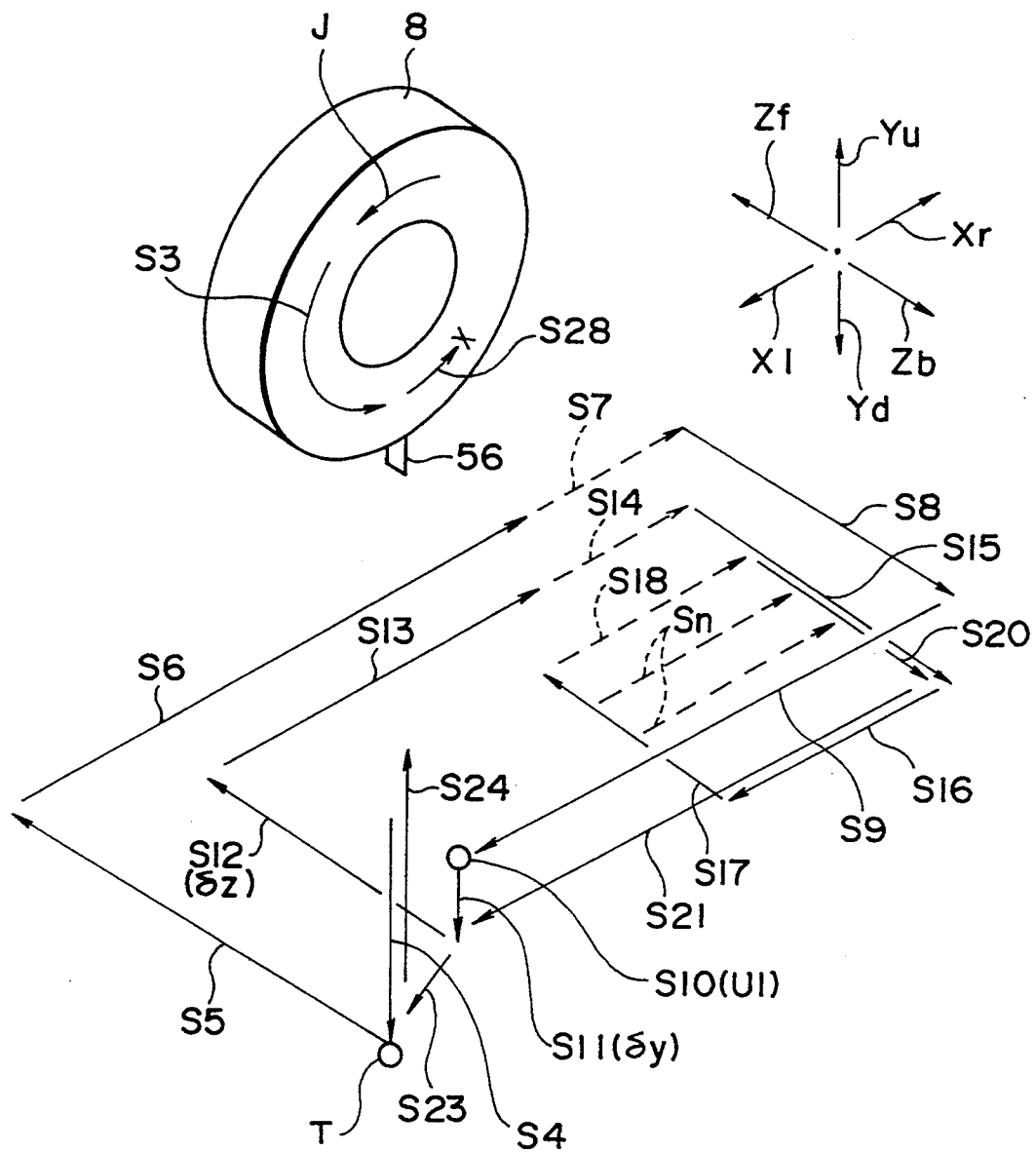
FIG. 24 is an explanatory view of the process order.

FIG. 24 is an explanatory view of the order of precision cutting processes. The moving direction of the Z cutting table 4 is expressed by arrows Zf and Zb, the moving direction of the Y up-and-down table 14 is expressed by arrows Yu and Yd, and the moving direction of the X feed table 3 is expressed by arrows X' and X in an isometric drawing. The cutting tool 56 is rotated in a direction of an arrow J in FIG. 24. The rotation of the cutting tool 56 is controlled to be started in step S3 (to be described later), and to be stopped in step S28. Arrows S1 to Sn illustrated below the cutting tool 56 correspond to the moving directions of the tables, and are expressed by an isometric drawing in correspondence with steps S of driving control flow charts (to be described later).

Figure 25:
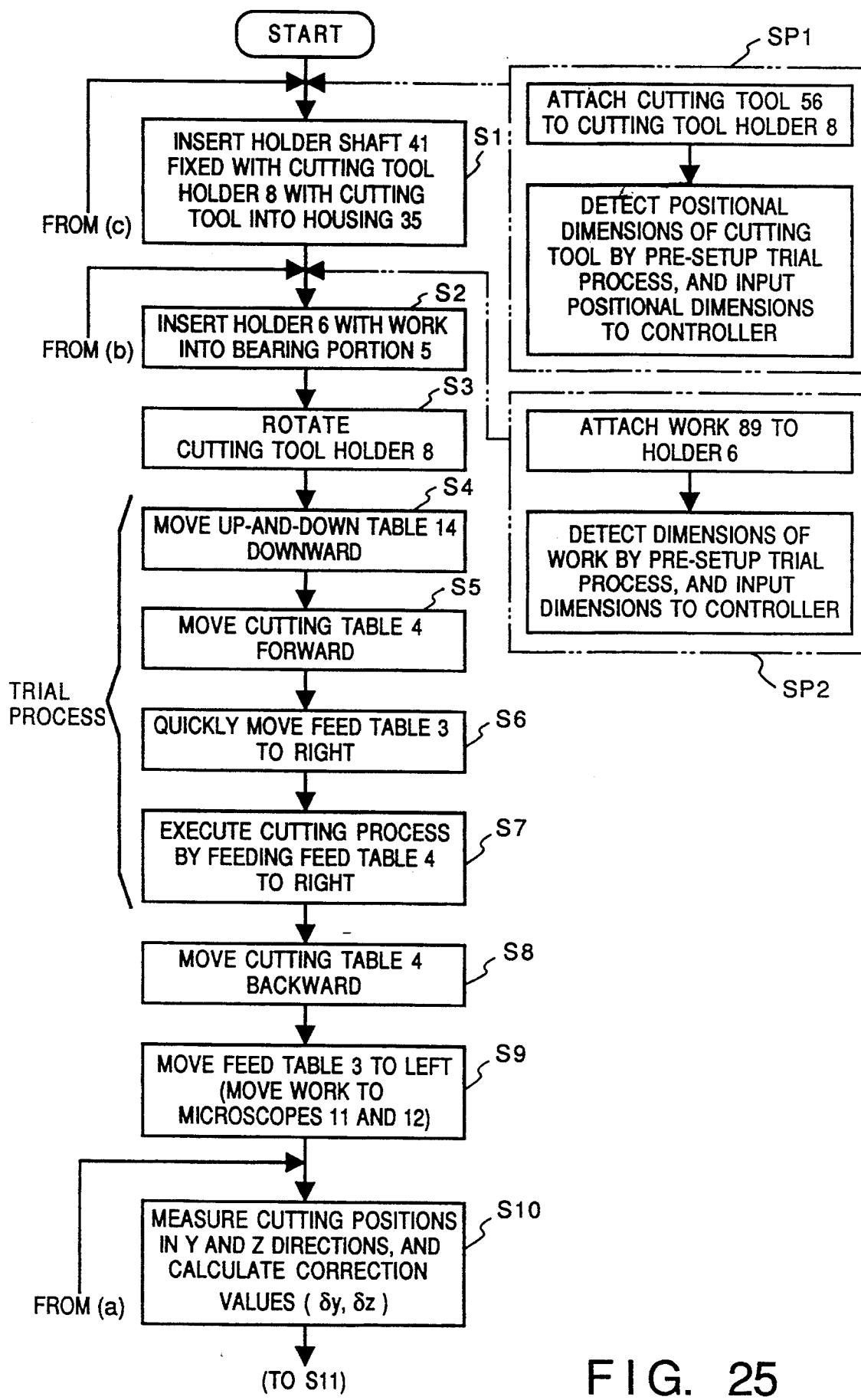
FIGS. 25, 26, and 27 are flow charts showing a cutting process sequence.
Figure 26:
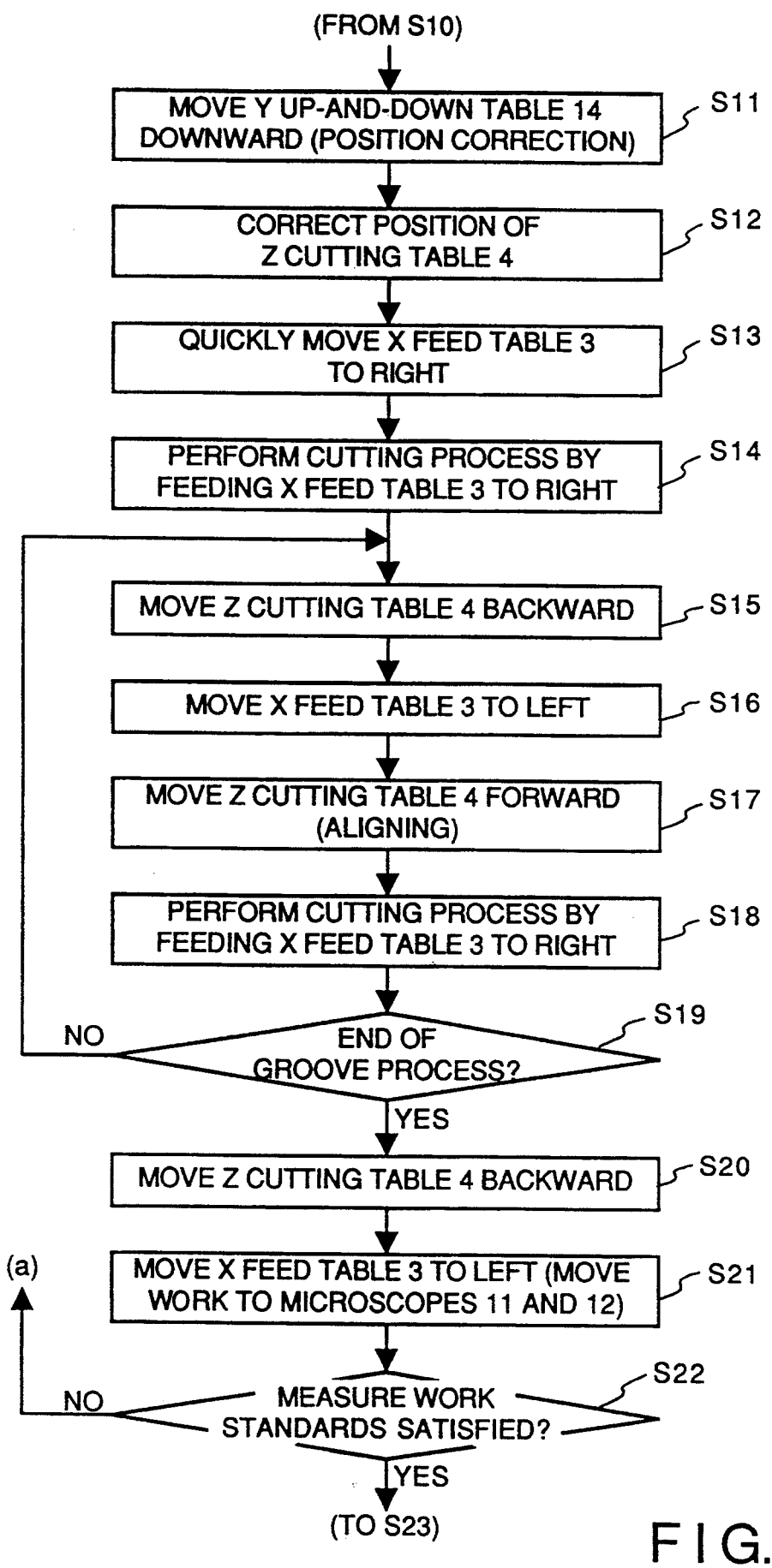
Figure 27:
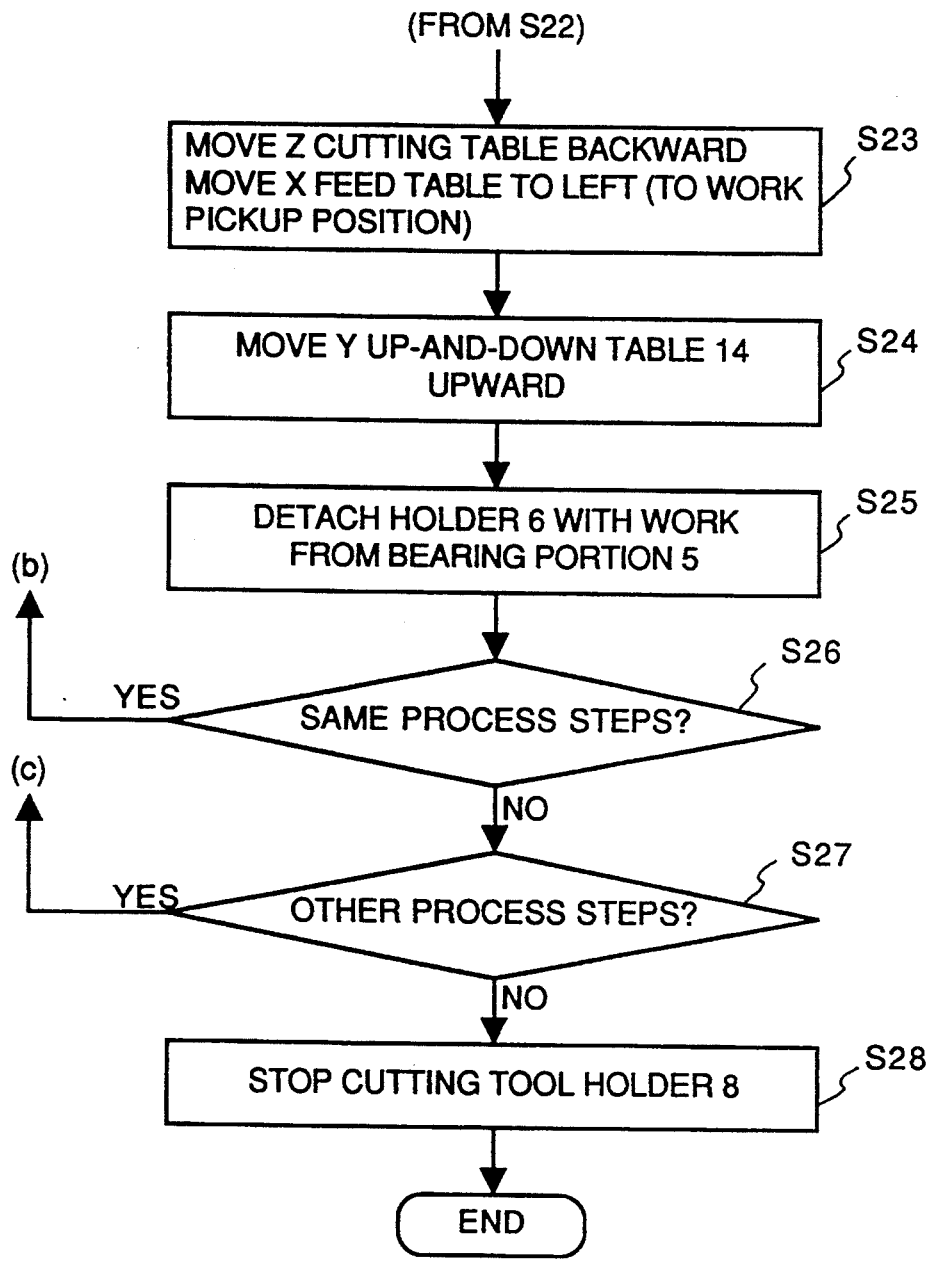
Figure 28A:
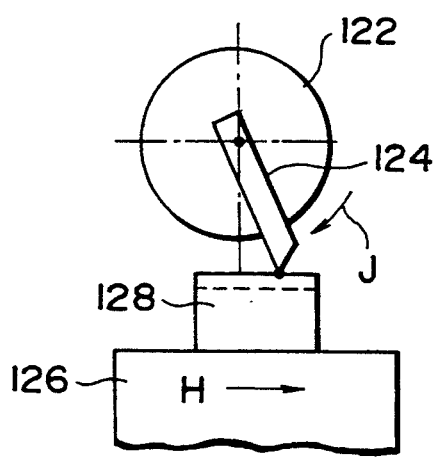
FIGS. 28A and 28B are schematic views showing a main part of a conventional cutting process machine.
Figure 28B:
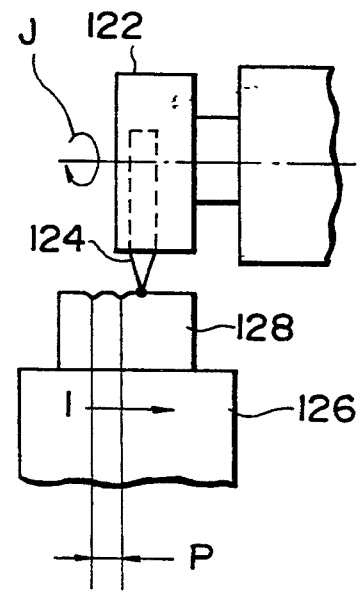
Figure 29:
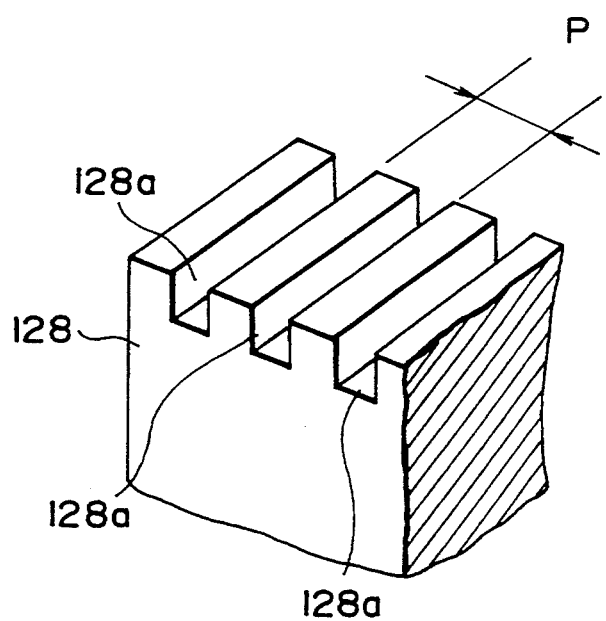
FIG. 29 is a perspective view showing a finished state of a work.

FIGS. 25 to 27 are driving control flow charts corresponding to FIG. 24. In FIGS. 25 and 24, in step SP1 as a driving preparation step of the machine, the cutting tool 56 is attached to the cutting tool holder 8. Thereafter, the positional dimensions of the cutting tool 56 are measured by a pre-setup trial process, and are input to the controller 400. Thereafter, in step S1, the holder shaft 41 is inserted in the housing 35. Meanwhile, in preparation step SP2, the work 89a is fixed to the holder 6. Then, the dimensions of the work 89a are measured by a pre-setup trial process, and are input to the controller 400.

Then, the holder 6 is inserted in and fixed to the bearing portion 5, and air is supplied to the air pads, and the like. In step S3, as shown in FIG. 24, the rotation of the cutting tool holder 8 is started in the direction of the arrow J. The flow advances to step S4, and the Y up-and-down table 14 is moved downward in the direction of the arrow Yd to move the distal end of the cutting tool 56 to an escape point T.

In step S5, the Z cutting table 4 is moved forward in the direction of the arrow Zf, and in step S6, the X feed table 3 is quickly fed in the direction of the arrow Xr, so that the work is located at the cutting start position. Subsequently, cutting processes indicated by broken arrows in FIG. 24 are performed in step S7, thus completing the trial process.

Thereafter, the flow advances to step S8, and the Z cutting table 4 is moved backward in the direction of the arrow Zb. Upon movement of the X feed table 3 in step S9, the work is moved to the measurement position U1 of the horizontal and vertical microscopes. In step S10, the trial process amounts in the Y and Z directions are measured, and the correct ion values z and y to the pre-input point U2 at the right corner portion at the leftmost position of the fine groove 89d are calculated.

Subsequently, as shown in the flow chart in FIG. 26, the flow advances to step S11 to move the Y up-and-down table 14 downward by y. In step S12, the Z cutting table 4 is moved by z, thus preparing for the process of the first fine groove 89d. In step S13, the X feed table 3 is quickly fed in the direction of the arrow Xr, so that the work is located at the cutting start position. In step S14, the cutting process of the first fine groove 89d is performed.

Thereafter, in step S15, the Z cutting table 4 is moved backward in the direction of the arrow Zb. The flow then advances to step S16 to move the X feed table 3 in the direction of the arrow X This moving amount is defined for the process of an adjacent fine groove so as not to reach the measurement point U1. In step S17, the Z cutting table 4 is moved in the direction of the arrow Zf by a moving amount obtained by subtracting the predetermined pitch of the fine groove, and a preparation for the cutting process of the second fine groove is started.

In step S18, the X feed table 3 is moved in the direction of the broken arrow (FIG. 24) to perform the cutting process of the second fine groove. Thereafter, the X feed table 3 is moved in the direction of the broken arrow to perform cutting processes of third and subsequent fine grooves. It is then checked in step S19 if the processes of all the fine grooves are ended. If YES in step S19, the flow advances to step S20, and the Z cutting table 4 is moved backward in the direction of the arrow Zb. The flow advances to step S21, and the X feed table 3 is moved in the direction of the arrow X to move the work to the measurement point U1. In step S22, the dimensions of the work are measured by the microscopes. When the standards are satisfied, the flow advances to step S23; otherwise, the flow returns to node (a) in FIG. 25 to perform cutting processes again.

In the flow chart shown in FIG. 27, in step S23, the Z cutting table 4 is moved backward (in the direction of the arrow Zb), and the X feed table 3 is moved to the left (in the direction of the arrow X) to move the work to a pickup position T. Subsequently, in step S24, the Y up-and-down table 14 is moved upward in the direction of the arrow Yu. Thereafter, the flow advances to step S25, and the holder 6 attached with the work is removed from the bearing portion 5 to obtain the work after the cutting processes. In step S26, it is checked if the same processes are performed. If YES in step S26, the flow returns to node (b) to perform processes again. However, if NO in step S26, it is checked in step S27 if other processes are performed. If YES in step S27, the flow returns to node (c); otherwise, the rotation of the cutting tool holder 8 is stopped in step S28, thus ending the operations.

Since fine grooves are formed in the work with high precision by the above-mentioned cutting processes, the work can be utilized as, e.g., a metal mold upon resin injection molding of an ink jet nozzle. As described above, according to the present invention, in processes of, e.g., fine grooves, since a work and a cutting tool are exchangeably fixed to a rotor supported by a static pressure bearing, a program can be easily changed, processes including a large number of steps can be realized with high precision by a smaller number of steps.

Since microscopes are arranged within the machine, even when an error occurs upon a change in program, it can be corrected by measuring a work by the microscopes, and processes with high precision can be attained.

As many apparently widely different embodiments of the present invention can be made without departing from the spirit and scope thereof, it is to be understood that the invention is not limited to the specific embodiments thereof except as defined in the appended claims.

What is claimed is:

1. A precision cutting process method for a precision cutting process machine for aligning a workpiece relative to a continuously rotating cutting tool and cutting the workpiece in a predetermined pattern, with the precision cutting processing machine comprising:

a main body base portion;

an up-and-down moving table driven in an up-and-down direction with respect to the main body base portion;

a cutting tool arranged on the up-and-down moving table, sets a plane formed upon rotation of the cutting tool on a plane along a back-and-forth direction of the main body base portion, and is continuously rotated when cutting the workpiece;

a back-and-forth moving table driven in the back-and-forth direction with respect to the main body base portion;

a right-and-left moving table fixed on the back-and-forth moving table, and driven in a right-and-left direction with respect to main body base portion;

holding means, arranged on the right-and-left moving table, for detachably holding the workpiece;

measurement means, arranged on the up-and-down moving table, for measuring dimensions of the workpiece in the up-and-down and right-and-left directions; and control means connected to the measurement means and the up-and-down, right-and-left, and back-and-forth moving tables, said method comprising the steps of:

inputting in advance a desired pattern after a cutting process of the workpiece to the control means;

measuring the dimensions after a trial cutting process of a portion of the workpiece within a cutting range by the cutting tool, and inputting a measurement result to the control means;

calculating a correction value from data input in the inputting and measuring steps;

driving the right-and-left moving table and the up-and-down moving table so as to perform the precision alignment on the basis of the correction value; and cutting the workpiece to form the desired pattern.

2. The method according to claim 1, wherein the holding means comprises a holder bearing portion statically fluid supported on the right-and-left moving table, and a holder portion statically supported by the holder bearing portion and held to be able to be inserted/removed in the back-and-forth direction, said method further comprising the steps of:

fixing the workpiece to the holder portion, and then setting the holding state; and removing the holder portion from the holder bearing portion after the cutting process.

3. The method according to claim 2, wherein the workpiece is formed to have a planar shape, an upper edge portion of the workpiece is held along a driving direction of the right-and-left moving table, an end portion of the upper edge portion of the workpiece is cut in the trial cutting process as the portion within the cutting range, and thereafter, the cutting step is repetitively executed while performing a driving operation by a predetermined pitch in the right-and-left direction.

4. The method according to any one of claims 1 to 3, wherein the cutting tool is formed as a forming tool and is rotated at a high speed to perform the cutting process, thereby obtaining fine grooves, and a finished workpiece is used as a metal mold member for resin injection molding of an ink jet nozzle for performing recording by ejecting ink.

5. A precision cutting process machine for aligning a workpiece relative to a continuously rotating cutting tool and cutting the workpiece in a predetermined pattern, comprising:

a main body base portion;

an up-and-down moving table driven in an up-and-down direction with respect to the main body base portion;

a cutting tool arranged on said up-and-down moving table, setting a plane formed upon rotation of said cutting tool on a plane along a back-and-forth direction of said main body base portion, and being continuously rotated when cutting the workpiece;

a back-and-forth moving table driven in the back-and-forth direction with respect to the main body base portion;

a right-and-left moving table fixed on said back-and-forth moving table and driven in a right-and-left direction with respect to said main body base portion;

holding means, arranged on said right-and-left moving table, for detachably holding the workpiece, wherein said holding means comprises:

a holder portion for holding and fixing the workpiece; and a holder bearing portion allowing said holder portion to be able to be inserted/removed, and fixed on said right-and-left moving table, wherein said holder bearing portion is arranged in a direction along the plane formed upon rotation of said cutting tool, and said holder portion is statically fluid supported with respect to said holder bearing portion so as to be able to be inserted/removed.

6. The machine according to claim 2, wherein said cutting tool is statically fluid supported to be able to be inserted/removed with respect to said up-and-down moving table.

7. The machine according to claim 6, further comprising:

a rotary spindle arranged integrally with said cutting tool, wherein said rotary spindle is fluid supported in radial and thrust directions to be able to be inserted/removed; and cooling means for preventing said rotary spindle axially supported on said up-and-down moving table from thermally expanding/contracting in the thrust direction and arranged at a predetermined position of the axial support.

8. The machine according to claim 7, wherein said rotary spindle is statically fluid supported in the radial and thrust directions to be able to be inserted/removed, and said cooling means is arranged to supply air to the static support portion.

9. The machine according to claim 8, further comprising an oil-cooling type driving motor incorporated in said up-and-down moving table, wherein said rotary spindle is directly engaged with an engaging portion formed on an end portion of an output shaft of said oil-cooling type driving motor so as to transmit a rotational force.

10. The machine according to claim 8, wherein said rotary spindle and said cutting tool are formed of a predetermined metallic material having a small thermal expansion coefficient.

11. The machine according to claim 8, wherein the support portion of said rotary spindle is subjected to a hard surface treatment.

12. The machine according to claim 5, wherein an attaching portion is integrally provided to said holder portion for holding and fixing workpiece, said holder portion is statically fluid supported by performing position regulation with respect to said holder bearing portion, and said attaching portion, said holder portion, and said bearing portion are enclosed in an air-tight enclosure, the outer air being supplied into said air-tight enclosure to maintain internal pressure of said air-tight enclosure to be higher than an external pressure, thereby preventing entrance of foreign matter.

13. The machine according to claim 12, wherein said holder portion is detachably provided to said holder bearing portion in a workpiece process direction, and said air-tight enclosure is removably arranged.

14. The machine according to claim 12 or 13, wherein a supply pipe for supplying the outer air is different from a pipe used for the static fluid support, and exhausted air used for the static support is utilized for supplying the outer air.

15. The machine according to claim 14, wherein leakage control of the supplied outer air is made to satisfy $Pa > Pb > Pc$, where Pa is the outer air supply pressure into said air-tight enclosure, Pb is the internal pressure in said air-tight enclosure, and Pc is the external atmospheric pressure.

16. The machine according to claim 5, further comprising:

cutting state monitoring means for monitoring a cutting process state of the workpiece, said monitoring means being statically fluid supported with respect to said main body base portion, and wherein a contact state between said holder portion and said holder bearing portion is electrically detected by electrode portions connected to said holder portion and said holder bearing portion, thereby detecting generation of an overload acting on the workpiece or said holder portion.

17. The machine according to claim 16, wherein said holder bearing portion comprises a pneumatic bearing body formed of a conductive porous member and also serves as said electrode portion.

18. A precision cutting process machine for aligning a workpiece relative to a continuously rotating cutting tool and cutting the workpiece in a predetermined pattern, comprising:

a main body base portion;

an up-and-down moving table driven in an up-and-down direction with respect to said main body base portion;

a cutting tool arranged on said up-and-down moving table, setting a plane formed upon rotation of said cutting tool on a plane along a back-and-forth direction of said main body base portion, and being continuously rotated when cutting the workpiece;

a back-and-forth moving table driven in the back-and-forth direction with respect to the main body base portion;

a right-and-left moving table fixed on said back-and-forth moving table, and driven in a right-and-left direction with respect to said main body base portion;

holding means, arranged on said right-and-left moving table, for detachably holding the workpiece;

shielding means extendable in a driving direction of said right-and-left moving table and arranged at opposing end portions of said right-and-left moving table, wherein a lower edge portion of said shielding means is dipped in a liquid groove chamber arranged on said back-and-forth moving table, thereby preventing entrance of foreign matter between said back-and-forth moving table and said right-and-left moving table.

19. A precision cutting process machine for aligning a workpiece relative to a continuously rotating cutting tool and cutting the workpiece in a predetermined pattern, comprising:

a main body base portion;

an up-and-down moving table driven in an up-and-down direction with respect to said main body base portion;

a cutting tool arranged on said up-and-down moving table, setting a plane formed upon rotation of said cutting tool on a plane along a back-and-forth direction of said main body base portion, and being continuously rotated when cutting the workpiece;

a back-and-forth moving table driven in the back-and-forth direction with respect to the main body base portion;

a right-and-left moving table fixed on said back-and-forth moving table and driven in a right-and-left direction with respect to said main body base portion;

holding means, arranged on the right-and-left moving table, for detachably holding the workpiece;

measurement means, arranged on said up-and-down moving table, for measuring dimensions of the workpiece in the up-and-down and right-and-left directions; and a driving motor fixed to said up-and-down moving table, wherein said measurement means is fixed to said up-and-down moving table through an attaching member different from a fixing member for said driving motor so as to precisely align the workpiece in the up-and-down and right-and-left directions relative to said cutting tool rotated by said driving motor and to perform the cutting process.

20. The according to claim 19, wherein said driving motor includes cooling means connected to an air supply portion so that a temperature rise of said driving motor does not influence said fixing means, and an influence of a temperature rise on said attaching member and said measurement means is minimized.

21. The machine according to claim 20, wherein said measurement means comprises a first microscope for measurement in the up-and-down direction and a second microscope for measurement in the right-and-left direction, and said attaching member is divided for said first and second microscopes.

22. A precision cutting process machine for aligning a workpiece relative to a continuously rotating cutting tool and cutting the workpiece in a predetermined pattern, comprising:

a main body base portion;

an up-and-down moving table driven in an up-and-down direction with respect to said main body base portion;

a cutting tool arranged on said up-and-down moving table, setting a plane formed upon rotation of said cutting tool on a plane along a back-and-forth direction of said main body base portion, and being continuously rotated when cutting the workpiece;

a back-and-forth moving table driven in the back-and-forth direction with respect to said main body base portion;

a right-and-left moving table fixed on said back-and-forth moving table, and driven in a right-and-left direction with respect to said main body base portion;

holding means, arranged on said right-and-left moving table, for detachably holding the workpiece; and measurement means, arranged on said up-and-down moving table, for measuring dimensions of the workpiece in the up-and-down and right-and-left directions, wherein said cutting tool is formed as a forming tool, and is rotated at a high speed to perform the cutting process, thereby obtaining fine grooves, and a finished workpiece is used as a metal mold member for resin injection molding of an ink jet nozzle for performing recording by ejecting ink.

23. A precision cutting process machine for aligning a workpiece relative to a continuously rotating cutting tool and cutting the workpiece in a predetermined pattern, comprising:

a main body base portion;

an up-and-down moving table driven in an up-and-down direction with respect to said main body base portion;

a cutting tool arranged on said up-and-down moving table, setting a plane formed upon rotation of said cutting tool on a plane along a back-and-forth direction of said main body base portion, and being continuously rotated when cutting the workpiece;

a back-and-forth moving table driven in the back-and-forth direction with respect to said main body base portion;

a right-and-left moving table fixed on said back-and-forth moving table, and driven in a right-and-left direction with respect to said main body base portion;

holding means, arranged on said right-and-left moving table, for detachably holding the workpiece, wherein said up-and-down moving table comprises:

driving means, provided on said main body, for driving an output shaft;

guide means for converting a pivoting force of said output shaft into a reciprocal linear motion, and moving a moving member in a direction parallel to the up-and-down direction of said main body base portion;

fixing means for interposing said guide means for conversion with respect to said moving member;

elastic portions allowing said fixing means to be two-dimensionally movable on a plane perpendicular to a moving direction of said moving member, and arranged to be shifted from each other in the moving direction; and a regulating portion for regulating the movement of said moving member by bringing a stop member fixed to said output shaft in direct contact with said conversion means.

24. The machine according to claim 23, wherein said output shaft comprises a ball screw shaft body and said guide means comprises a ball screw nut.

25. The machine according to claim 23 or 24, wherein said guide means is arranged in the up-and-down direction with respect to said main body base portion to guide said moving member in the up-and-down direction; and further comprising balancing means balanced with a weight of said moving member.

* * * * *

UNITED STATES PATENT AND TRADEMARK OFFICE
CERTIFICATE OF CORRECTION

PATENT NO. : 5,348,431
DATED : September 20, 1994
INVENTOR(S) : Kusunoki et al.

Page 1 of 2

It is certified that error appears in the above-indentified patent and that said Letters Patent is hereby corrected as shown below:

On the Title page, item [56] under References Cited:

FOREIGN PATENT DOCUMENTS, "33773  1/1991  Japan" should read --3-3773  1/1991  Japan--.

COLUMN 9:

Line 31, "E-E" should read --2'-2'--.
Line 33, "F-F" should read --3'-3'--.
Line 35, "G-G" should read --4'-4'--.

COLUMN 12:

Line 33, "31b," should read --31h.--.

COLUMN 19:

Line 26, "X' and X" should read --Xr and X1--.

COLUMN 20:

Line 16, "X" should read --X.--.

COLUMN 23:

Line 14, "fixing" should read --fixing the--.

UNITED STATES PATENT AND TRADEMARK OFFICE
CERTIFICATE OF CORRECTION

PATENT NO. : 5,348,431
DATED : September 20, 1994
INVENTOR(S) : Kusunoki et al.

It is certified that error appears in the above-indentified patent and that said Letters Patent is hereby corrected as shown below:

COLUMN 24:

Line 2, "the" should read --said--.
Line 5, "table," should read --table--.
Line 40, "the" should read --said--.

Line 55, "The" should read --The machine--.

COLUMN 25:

Line 16, "table," should read --table--.

COLUMN 26:

Line 7, "table," should read --table--.
Line 9, "tion;" should read --tion; and--.

Signed and Sealed this

Second Day of May, 1995

BRUCE LEHMAN

Attest:

Attesting Officer

Commissioner of Patents and Trademarks